US011970164B1

(12) United States Patent
Havlak et al.

(10) Patent No.: US 11,970,164 B1
(45) Date of Patent: Apr. 30, 2024

(54) ADVERSE PREDICTION PLANNING

(71) Applicant: Zoox, Inc., Foster City, CA (US)

(72) Inventors: Francis Sheldon Havlak, Half Moon Bay, CA (US); Alexander Dean Hertzberg, Berkeley, CA (US); Charles Gregory Marcil, Redwood City, CA (US)

(73) Assignee: ZOOX, INC., Foster City, CA (US)

( * ) Notice: Subject to any disclaimer, the term of this patent is extended or adjusted under 35 U.S.C. 154(b) by 506 days.

(21) Appl. No.: 16/697,096

(22) Filed: Nov. 26, 2019

(51) Int. Cl.
*B60W 30/095* (2012.01)
*G05D 1/00* (2006.01)
*G06N 20/00* (2019.01)
*G06V 20/58* (2022.01)

(52) U.S. Cl.
CPC .... *B60W 30/0956* (2013.01); *B60W 30/0953* (2013.01); *G05D 1/0214* (2013.01); *G06N 20/00* (2019.01); *G06V 20/58* (2022.01); *B60W 2554/00* (2020.02)

(58) Field of Classification Search
None
See application file for complete search history.

(56) References Cited

U.S. PATENT DOCUMENTS 9,669,827 B1 * 6/2017 Ferguson ............. G05D 1/0088
2017/0329332 A1 * 11/2017 Pilarski ............... B60W 30/095
2020/0111366 A1 * 4/2020 Nanri .................... B60W 30/10

* cited by examiner

*Primary Examiner* — Christian Chace
*Assistant Examiner* — Katherine Marie Fitzharris
(74) *Attorney, Agent, or Firm* — Lee & Hayes P.C.

(57) ABSTRACT

A vehicle computer system implements techniques to predict behavior of objects detected by a vehicle operating in the environment. The techniques include using a model to determine a first object trajectory for an object (e.g., a predicted object trajectory) and/or a potential object in an occluded area, as well as a second object trajectory for the object or potential object (e.g., an adverse object trajectory). The model is configured to use one or more algorithms, classifiers, and/or computational resources to predict candidate trajectories for the vehicle based on at least one of the first object trajectory or the second object trajectory. Based on the predicted behavior of the object (or potential object) and the predicted candidate trajectories for the vehicle, a vehicle computer system controls operation of the vehicle.

24 Claims, 7 Drawing Sheets

ADVERSE PREDICTION PLANNING

Planning systems in autonomous and semi-autonomous vehicles determine actions for a vehicle to take in an operating environment. Actions for a vehicle may be determined based in part on avoiding objects present in the environment. For example, an action may be generated to go around a bicycle, to change a lane to avoid another vehicle in the road, or the like. The planning systems may predict numerous possible behaviors for each detected dynamic object in the environment. However, in environments with numerous dynamic objects performing numerous predictions for each dynamic object may be computationally costly and, in some cases, impossible with onboard computing capabilities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
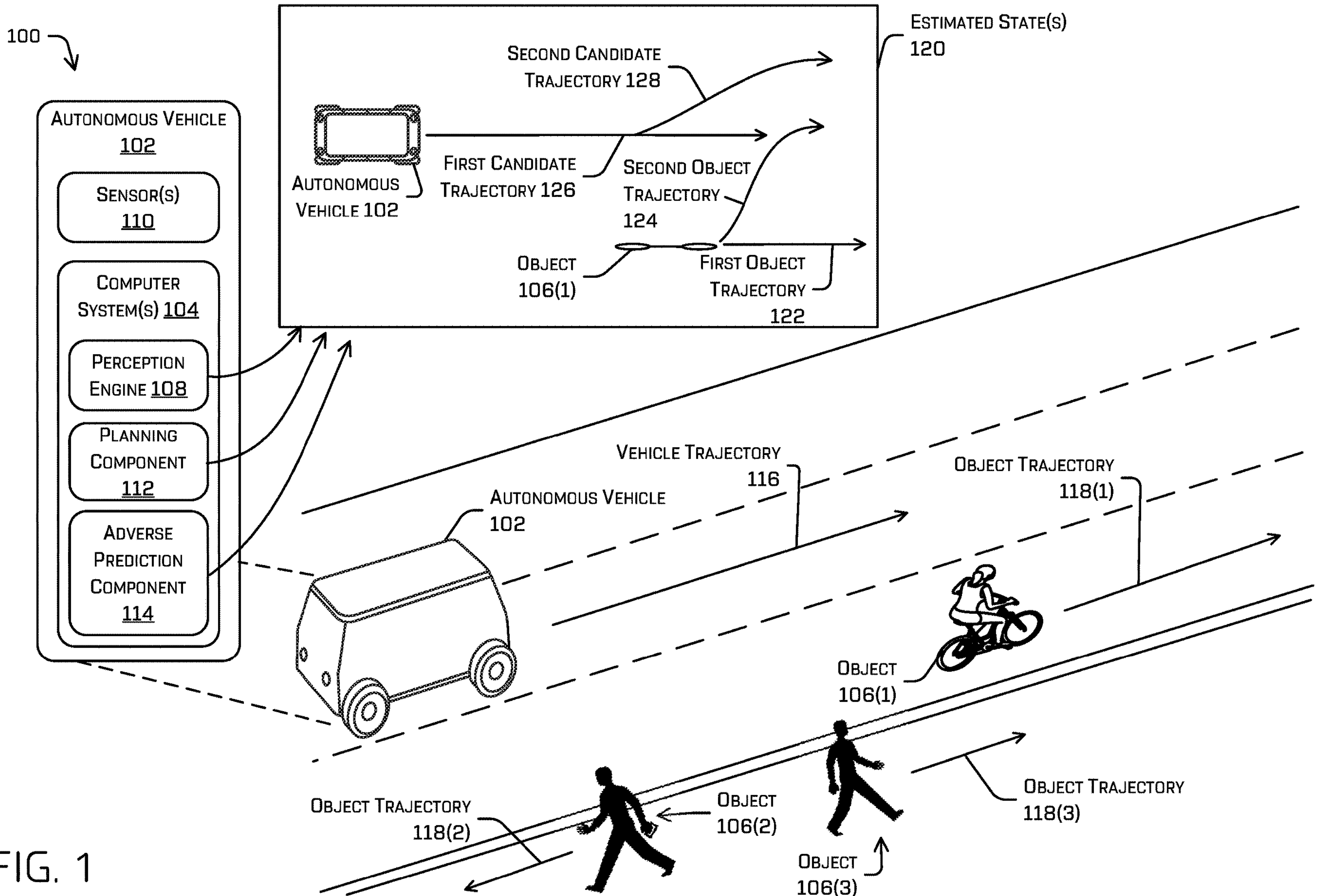
FIG. 1 is an illustration of an example environment, in which an example vehicle applies one or more models to predict behavior for an object in the environment.

As noted above, performing numerous predictions for each detected object in an environment of a vehicle may be computationally costly and, in some cases, impossible with onboard computing capabilities. In addition, some objects are highly maneuverable and may behave unexpectedly when in the environment of the vehicle. Still further, devoting computational resources to predicting a number of likely actions by an object may overlook actions that, while unlikely, would have an adverse impact on operation of the vehicle.

This application describes techniques for determining trajectories for a vehicle in environments with objects that may behave unexpectedly and/or are capable of changing speed or direction quickly. For instance, a vehicle computer system may predict an adverse behavior for an object (e.g., a behavior most likely to affect or impact operation of the vehicle). In some examples, the object (e.g., a bicycle, a pedestrian, another vehicle, an animal, etc.) may unexpectedly change direction and/or speed requiring an action by the vehicle to avoid a collision. The vehicle computer system may determine a candidate trajectory for the vehicle that is based at least in part on the predicted adverse behavior of the object, thereby improving vehicle safety by planning for the possibility that the object may perform the adverse behavior at a point in time.

In some examples, an adverse prediction model of the vehicle computer system may be designed to devote computational resources to predict an adverse behavior of an object (e.g., an outlier behavior, a sudden change in object behavior, uncharacteristic object behavior, a behavior by the object that may result in an impact to operation of the vehicle, and so on). For instance, the adverse prediction model may predict a trajectory (e.g., direction, speed, acceleration, etc.) for objects such as pedestrians, bicycles, or vehicles that are violating traffic laws, moving erratically, or otherwise navigating in the environment. The adverse trajectory predicted by the adverse prediction model may represent an action of the object that has the potential to most affect or impact operation of the vehicle (e.g., intersect a trajectory of the vehicle, cause the vehicle to swerve or brake hard, etc.). In some examples, the degree that a behavior of the object has the potential to affect or impact operation of the vehicle may be measured by a cost function taking into account costs of various actions by the vehicle. In that case, the adverse trajectory may be a trajectory of the object that would result in a highest output of the cost function. By way of example and not limitation, the adverse prediction model may predict a trajectory for a bicycle based at least in part on characteristics of the bicycle (e.g., maximum acceleration, maximum turning ability at a given speed, and so on). In such an example, the vehicle computer system may predict a candidate trajectory for the vehicle (using a same or different model) with consideration to an output from the adverse prediction model thereby improving vehicle safety by providing the vehicle with a candidate trajectory that is capable of safely avoiding the potentially adverse behavior (e.g., the maximum turning ability and/or the maximum acceleration of the bicycle).

In some examples, the adverse prediction model may take into account potential of an action to affect or impact operation of the vehicle and likelihood of the object to perform the action. That is, in some examples, the adverse prediction model may not necessarily plan for a most adverse action of the object if a likelihood of the most adverse action occurring is sufficiently unlikely. In various examples, the adverse prediction model may be based on an output from a constrained search optimization technique. In some examples, the trajectory predicted by the adverse prediction model may be based on an output of a cost function as well as a likelihood that the object will perform the adverse behavior. For instance, the trajectory predicted by the adverse prediction model may comprise a potential action of the object that is predicted to result in a cost above a cost threshold and a probability of occurrence above a probability threshold. In other words, while an Olympic sprinter may be capable of accelerating at over 3 meters per second$^2$, the likelihood of the vehicle encountering an Olympic sprinter is extremely low, and the vehicle may instead plan based on objects that the vehicle is reasonably likely to encounter. In the case of a pedestrian for instance, the vehicle may set a maximum acceleration for a pedestrian based on a fastest portion of general population (e.g., a top 20% of the population, a top 10% of the population, etc.).

The vehicle may detect objects using one or more sensors while navigating in the environment. The objects may include static objects (e.g., buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be input into the models to predict behavior (e.g., one or more predicted trajectories, locations, speeds, poses, and so on) of objects in the environment.

In some examples, the vehicle computer system may be configured to semantically classify the detected objects (e.g., determine an object type). A classification may include another vehicle (e.g., car, a pick-up truck, a semi-trailer truck, a tractor, a bus, a train, etc.), a pedestrian, a child, a bicyclist, a skateboarder, an equestrian, an animal, or the like. For example, the vehicle computer system may detect two objects and classify a first object as a pedestrian and a second object as a bicycle. In various examples, the classification of the object may be used by a model to determine object trajectories and other characteristics (e.g., maximum speed, acceleration, maneuverability, etc.). In this way, potential actions by the object may be considered based on characteristics of the object (e.g., how the object may potentially move in the environment).

In some examples, the vehicle computer system may determine two or more potential object trajectories for the object represented by the sensor data. In various examples, each object trajectory may be associated with a likelihood of occurrence and a magnitude of impact to operation of the vehicle (e.g., potential to cause the vehicle to change trajectory to avoid the object). A first object trajectory may represent, for example, a predicted trajectory most likely to be taken by the object at a point in time while a second object trajectory may represent an adverse prediction (e.g., a trajectory of the object most likely to affect operation of the vehicle at the point in time). For instance, in examples when the object is a pedestrian, the first object trajectory may indicate that the pedestrian will likely continue along a current path and the second object trajectory may indicate that the pedestrian may suddenly change direction towards the vehicle while also increasing a rate of speed. Thus, in various examples, the first object trajectory may have a higher likelihood of occurrence than the second object trajectory and/or the second object trajectory may have a higher magnitude of impact to operation of the vehicle than the first object trajectory. In some examples, the vehicle computer system may use the first object trajectory and/or the second object trajectory when planning actions (e.g., routes, trajectories, and so on) for the vehicle.

In some examples, the likelihood of occurrence and/or the magnitude of impact to operation of the vehicle for each object trajectory may be based at least in part on the object type. For instance, in examples when the object is a skateboarder or an animal, one or more models may determine different object trajectories that are specific to how the skateboarder and/or the animal may move in the environment. In various examples, characteristics associated with each object type may be used by the vehicle computer system to determine an object trajectory. Examples of characteristics of an object type may include, but not be limited to: a maximum longitudinal acceleration, a maximum lateral acceleration, a maximum vertical acceleration, a maximum speed, maximum change in direction for a given speed, and the like. The object trajectory determined from one or more of the characteristics of the object type may be based on simple dynamics of the object type. By determining adverse predictions based on simple dynamics, adverse scenarios that may occur in the future may be generalized to include scenarios not seen before by the object and/or scenarios that may be imperceptible to the sensors of the vehicle. For instance, the vehicle may plan for the bicycle to veer in the path of the vehicle to avoid an imperceptible object such as glass on the road surface.

In some examples, the object may comprise a bicycle and the vehicle computer system may determine the second object trajectory based at least in part on a maximum lateral acceleration and/or a maximum longitudinal acceleration that the bicycle may take at a time in the future (e.g., 1-8 seconds after the current time). In this way, the vehicle computer system may determine when the bicycle may swerve toward the vehicle with maximum acceleration. In some examples, the vehicle computer system may determine candidate trajectories for the vehicle based at least in part on the second object trajectory. Thus, in examples when the object is a bicycle, the maximum lateral acceleration and/or the maximum longitudinal acceleration of the bicycle may be used by the vehicle computer system to control acceleration, braking, and/or steering of the vehicle.

In some examples, the vehicle computer system may input at least a portion of the sensor data into one or more models that determine candidate trajectories for the vehicle to follow in the environment. In various examples, the vehicle computer system may predict a first candidate trajectory for the vehicle based at least in part on both the first object trajectory and the second object trajectory. Here, the vehicle may act in accordance with the first candidate trajectory to guide the vehicle with consideration to the most likely trajectory the object may take (e.g., the first object trajectory) while also generating one or more candidate trajectories taking into consideration an adverse trajectory the object may take (e.g., the second object trajectory). In other examples, the vehicle computer system may predict the second candidate trajectory for the vehicle based at least in part on the second object trajectory. For instance, the vehicle may act in accordance with the second candidate trajectory to guide the vehicle with consideration to an adverse trajectory (e.g., the second object trajectory). In some examples, the vehicle may navigate through the environment according to the first candidate trajectory under nominal scenarios and may use the second candidate trajectory in adverse scenarios (e.g., in the event the object initiates the adverse behavior). In some examples, the vehicle may navigate the environment according to the first candidate trajectory, the second candidate trajectory, and/or a combination of the first candidate trajectory and the second candidate trajectory.

In some examples, the vehicle computer system may control operation of the vehicle using the first candidate trajectory or the second candidate trajectory to achieve different levels of acceleration, braking, and/or steering. For instance, the first candidate trajectory may be associated with different acceleration, braking, and/or steering thresholds than the acceleration, braking, and/or steering thresholds associated with the second candidate trajectory. In general, the second candidate trajectory is available to control operation of the vehicle when an adverse object behavior occurs to provide the vehicle with greater thresholds to accelerate, brake, and/or steer to avoid a collision with a detected object that is behaving uncharacteristically. For instance, the first candidate trajectory may be chosen to keep acceleration and deceleration within certain thresholds (e.g., to minimize the cost function), but the second candidate trajectory may apply one or more relaxed thresholds (e.g., harder braking, higher lateral acceleration, etc.) to avoid collision in the event that the object takes the adverse trajectory. This may be done to allow the vehicle to plan routes that are not overly cautious (e.g., that allow the vehicle to effectively pass dynamic objects in the environment).

Generally, the output of the model(s) may be used by a vehicle computer system (e.g., a planning component of the vehicle computer system) to control operation of the vehicle. Predictions from model(s) that take into consideration adverse object behavior may be fed to a planning component of the vehicle computer system to improve how the vehicle navigates (e.g., avoids and/or interacts with objects) in the environment. In some examples, controlling operation of the vehicle may comprise the vehicle computer system implementing different latency threshold(s) (e.g., an amount of time to detect, plan, and implement a reaction to an event occurring in real-time). In some examples, a latency threshold may be implemented by the vehicle computer system to specify an amount of time from detecting an adverse behavior to engaging braking, acceleration, and/or steering.

By way of example and not limitation, a first model may be used to determine a first object trajectory, a second model may be used to determine the second object trajectory, and a third model may be used to determine the first candidate trajectory and the second candidate trajectory. In some examples, the first model that determines the first object trajectory may be a machine learned model while the second model that determines the second object trajectory may be a tree model. In some examples, the tree model may be based at least in part on one or more characteristics associated with the object type of the object. In some examples, the one or more characteristics associated with the object type may comprise a maximum lateral acceleration and/or a maximum longitudinal acceleration associated with the object type. As noted above, as used herein the term “maximum” may refer to an absolute maximum value for the object type (e.g., the Olympic sprinter in the case of a pedestrian object type), or a predetermined value expected to be encountered by the vehicle (e.g., fastest 20%, 10%, or other portion of the population in the case of the pedestrian object type). The third model used to determine the first candidate trajectory and the second candidate trajectory may be a machine learning model that receives data output by the first model and/or the second model. In some examples, a single model may predict an adverse behavior of object(s) in the environment, an object trajectory, and the candidate trajectories for the vehicle. Further discussion of models used to predict object behavior, object trajectories, or vehicle trajectories is discussed below in relation to FIGS. 1-4, and elsewhere.

As described herein, models may be representative of machine learned models, statistical models, or a combination thereof. That is, a model may refer to a machine learning model that learns from a training data set to improve accuracy of an output (e.g., a prediction). Additionally, or alternatively, a model may refer to a statistical model that is representative of logic and/or mathematical functions that generate approximations which are usable to make predictions.

By way of example and not limitation, a model may output behavior predictions for objects in a region of interest around the vehicle. The region of interest may be determined based at least in part on a region being near the vehicle (e.g., a threshold distance), a region that includes a planned path of the vehicle, a region in which the vehicle is likely to interact with an object (e.g., an intersection, crosswalk, etc.), proximity of additional objects and/or an identifier in a map (stop sign, traffic light, crosswalk, lane, building, intersection, etc.) to the object, a region with unknown objects, a combination thereof, and so on.

Portions of the environment may be obscured or otherwise occluded by an object and may be referred to as occluded regions. Because of the lack of sensor data associated with an occluded region, it may be difficult to determine whether the occluded region is free of any objects or obstacles or whether the occluded region is occupied by a static obstacle or a dynamic object such as a vehicle or pedestrian. In some examples, models may predict a candidate trajectory for a vehicle navigating in an environment, and motion of the vehicle can be simulated along the candidate trajectory to determine predicted occluded regions associated with the candidate trajectory. For example, positions of the vehicle along the candidate trajectory in the future can be determined and occluded regions can be predicted based on locations of the vehicle and object(s) to determine predicted occluded regions. In some examples, a model (e.g., an adverse prediction model) may process the objects that are proximate to an occluded region. By implementing an adverse prediction model, the vehicle may plan for objects that may appear from an occluded region with little or no notice (e.g., a pedestrian runs out from an occluded region into the roadway). For instance, the vehicle computer system may plan for an adverse object type (e.g., an object type with a fastest acceleration), or one or more most likely object types based on the surrounding environment (e.g., a vehicle based on an intersection, or a pedestrian based on the existence of a crosswalk). In addition, or in the alternative, the vehicle computer system may plan for an object and/or an object type to be near an occluded region based at least in part on previous object detections in proximity to the occluded region (by our vehicle or historically by other previous vehicles). Additional details of predicting occupancy of an occluded region are described in U.S. patent application Ser. No. 16/399,743, filed Apr. 30, 2019, entitled “Predicting an Occupancy Associated With Occluded Region,” which is incorporated herein by reference. Additional details of determining occupancy of an occluded region are described in U.S. patent application Ser. No. 16/289,397, filed Feb. 2, 2019, entitled “Determining Occupancy of Occluded Regions,” which is incorporated herein by reference. Additional details of controlling a vehicle based on occluded regions in an environment are described in U.S. patent application Ser. No. 16/011,436, filed Jun. 18, 2018, entitled “Occlusion Aware Planning and Control,” which is incorporated herein by reference. Additional details of evaluating trajectories based on predicted occluded regions associated with the trajectories are described in U.S. patent application Ser. No. 16/246,208, filed Jan. 11, 2019, entitled “Occlusion Prediction and Trajectory Evaluation,” which is incorporated herein by reference. Additional details of evaluating risk associated with various trajectories are described in U.S. patent application Ser. No. 16/206,877, filed Nov. 30, 2018, entitled “Probabilistic Risk for Trajectory Evaluation,” which is incorporated herein by reference.

In at least some examples, an object detection may comprise a detection of an occluding area (which may or may not include an object). For instance, in examples when the vehicle computer system detects an occluded region, the associated object type may comprise a potential object type that may emerge from the occluded region. In examples when an occluded region is detected and an object is not detected within the occluded region, the vehicle computer system may determine a single object trajectory for the occluded region that represents a potential adverse behavior that may occur relative to the occluded region. In some examples, the object trajectory (e.g., the second object trajectory) may be based at least in part on a potential object type (and the characteristics thereof), while in other examples the object trajectory for the occluded region may be based at least in part on a predetermined trajectory that indicates a speed and direction for a potential object that may emerge from the occluded region.

In various examples, the vehicle computer system may store sensor data associated with actual location of an object at the end of the set of estimated states (e.g., end of the period of time) and use this data as training data to train one or more models. In some examples, the vehicle computer system may provide the data to a remote computing device (i.e., computing device separate from vehicle computer system) for data analysis. In such examples, the remote computer system may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference.

While examples are given in which the techniques described herein are implemented by a planner component and/or an adverse prediction component of the vehicle, in some examples, some or all of the techniques described herein could be implanted by another system of the vehicle, such as a Collision Avoidance System (CAS). For instance, the vehicle computer system may communicate one or more object trajectories (e.g., the second object trajectory) and/or vehicle trajectories with a Collision Avoidance System for use in collision avoidance. Additional details of a collision avoidance system is described in U.S. patent application Ser. No. 16/218,182, filed on Dec. 12, 2018, entitled "Collision Avoidance System with Trajectory Validation," which is incorporated herein by reference.

The techniques discussed herein may improve a functioning of a vehicle computer system in a number of ways. Traditionally, in control planning for an autonomous vehicle, a vehicle computer system may detect an object in an environment and may determine an action for the autonomous vehicle to take based on the detected objects. However, performing numerous predictions for possible vehicle trajectories during planning considerations (e.g., trajectory determinations, calculations, etc.) can be extremely computationally expensive, particularly when there are numerous objects in an environment that may behave in infinitely unexpected ways. By performing adverse behavior prediction techniques as described herein, computational load to predict trajectories for objects and/or the vehicle is reduced by considering the objects maximum capabilities, thereby improving the functioning of the vehicle computer system.

The techniques discussed herein may also improve a functioning of a vehicle computer system by receiving predictions from a model that provides additional detail for objects. In some examples, the vehicle computer system may improve safety by determining an object trajectory that represents an adverse action for the object to impact the safety of the vehicle. As a result, the vehicle computer system can control operation of the vehicle by utilizing planning considerations from the models that are more detailed and have a finer granularity than traditional planning considerations that predicted actions of objects without specifically taking into account an adverse action by the object. In various examples, determining an object trajectory that represents an adverse action by an object can be based on dynamics which minimizes computational processing required to predict the adverse action by the object. Thus, the techniques discussed herein may improve a functioning of a vehicle computer system by reducing computational resources (e.g., repurposing available computational resources) used to predict trajectories for objects in the environment of the vehicle.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a manually driven vehicle, a sensor system, or a robotic platform), and are not limited to autonomous vehicles. In another example, the techniques may be utilized in an aviation or nautical context, or in any system using machine vision (e.g., in a system using image data).

FIG. 1 is an illustration of in an environment 100, in which an autonomous vehicle 102 (vehicle 102), applies one or more models to predict behavior for an object. vehicle computer systems 104 may implement the one or more models to determine candidate trajectories for the vehicle 102.

In various examples, the vehicle computer system 104 may be configured to detect one or more objects 106 (e.g., objects 106(1), 106(2), 106(3)) in the environment 100, such as via a perception component 108. In some examples, the vehicle computer system may detect the object(s) 106, based on sensor data received from one or more sensors 110. In some examples, the sensor(s) 110 may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) 110 may include one or more remote sensors, such as, for example sensors mounted on another autonomous vehicle, and/or sensors mounted in the environment 100.

In various examples, vehicle 102 may be configured to transmit and/or receive data from other autonomous vehicles and/or the sensors 110. The data may include sensor data, such as data regarding objects 106 detected in the environment 100. In various examples, the environment 100 may include the sensors 110 for traffic monitoring, collision avoidance, or the like. In some examples, the sensors 110 may be mounted in the environment to provide additional visibility in an area of reduced visibility, such as, for example, in a blind or semi-blind intersection.

In various examples, the vehicle computer system 104 may receive the sensor data and may determine a type of object 106 (e.g., classify the type of object), such as, for example, whether the object 106 is a bicycle, such as object 106(1), a vehicle, a truck, a motorcycle, a moped, a pedestrian, such as objects 106(2) and 106(3), or the like.

In various examples, the vehicle computer system 104 may include a planning component 112. In general, the planning component 112 may determine a trajectory 116 for the vehicle 102 to follow to traverse through the environment 100. For example, the planning component 112 may determine various routes and trajectories and various levels of detail. In some examples, the planning component 112 may determine a route to travel from a first location (e.g., a current location) to a second location (e.g., a target location). The planning component 112 may determine (via a machine learning model, for example) an object trajectory 118(1) for the bicycle 106 that is the most likely trajectory that the bicycle 106 may take in the future. Also shown in FIG. 1, the planning component 112 may determine object trajectories 118(2) and 118(3) for the pedestrians 106(2) and 106(3).

FIG. 1 also depicts the vehicle computer system 104 including an adverse prediction component 114 to predict adverse behavior(s) associated with the objects 106 in the environment 100. In some examples, the adverse prediction component 114 comprises a model to determine one or more object trajectories such as the first object trajectory 122 of the bicycle 106 and/or the second object trajectory 124 of the bicycle 106. In some examples, the first object trajectory 122 for the bicycle 106 represents the most likely trajectory that the bicycle 106 may take in the future. In some examples, the first object trajectory 122 may comprise the object trajectory 118 determined by the planning component 112. In various examples, the second object trajectory 124 may represent a maximum turning ability and/or a maximum acceleration that the bicycle 106 may take at a point in time. In some examples, a prediction output by the adverse prediction component 114 may capture potential uncertainty and interaction by one or more objects in the environment 100. According to some examples, the adverse prediction component 114 may implement a decision tree model to represent uncertainty and interaction by the object with the "trunk" of the tree following a most likely predicted trajectory (e.g., a first object trajectory) and a single branch representing an adverse trajectory (e.g., a worst case trajectory) that the object may take at a point in time in the future (e.g., a second object trajectory). In some examples, the adverse prediction component 114 may implement one or more kinematic models that determine potential uncertainty and interaction by one or more objects in the environment 100.

In various examples, an output from the adverse prediction component 114 may be communicated with the planning component 112 and/or the perception component 108. In some examples, the vehicle computer system 104 may generate one or more estimated state(s) 120 to simulate trajectories determined by the perception component 108, the planning component 112, and/or the adverse prediction component 114. As shown in FIG. 1, the estimated states 120 includes a first candidate trajectory 126 for the vehicle 102 and a second candidate trajectory 128 for the vehicle 102. In some examples, the first candidate trajectory 126 may be based on the first object trajectory 122 for the bicycle 106 and the second object trajectory 124 of the bicycle 106 while the second candidate trajectory 128 for the vehicle 102 may be based on the second object trajectory 124 of the bicycle 106. Generally, the second candidate trajectory 128 may be associated with different (more heightened) acceleration, braking, and/or steering thresholds compared to acceleration, braking, and/or steering thresholds associated with the first candidate trajectory 126. In some examples, the first candidate trajectory 126 may comprise an acceleration, braking, and/or steering threshold (different from an acceleration, braking, and/or steering threshold associated with the trajectory 116) that enables the vehicle 102 to maneuver in ways that may avoid a collision with the bicycle 106. That is, because the first candidate trajectory 126 is based in part on the second object trajectory 124, different levels of accelerating, braking, and steering may be made available to the vehicle while it follows the first candidate trajectory 126 versus when it follows the trajectory 116 (e.g., prior to initiating the adverse prediction component 114).

In some examples, an output from the adverse prediction component 114 and/or an output from the planning component 112 may be combined to determine a single vehicle trajectory for a vehicle to follow. In such an example, a candidate trajectory for the vehicle may be determined based on a first object trajectory and/or a second object trajectory. In some examples, outputs from the adverse prediction component 114 and/or an output from the planning component 112 may be combined to determine a candidate vehicle trajectory without generating the one or more estimated state(s) 120 (e.g., the candidate vehicle trajectory may be made immediately available for the vehicle to follow without requiring simulation).

In some examples, the degree that a behavior of the object has the potential to affect or impact operation of the vehicle 102 may be measured by a cost function taking into account costs of various actions by the vehicle 102. In various examples, the adverse trajectory may be a trajectory of an object (e.g., bicycle 106) that would result in a highest output of the cost function. In some examples, candidate trajectories for the vehicle 102 (e.g., the first candidate trajectory 126 and/or the second candidate trajectory 128) may be associated with predetermined thresholds of the vehicle (e.g., a predetermined acceleration threshold, a predetermined braking threshold, a predetermined steering threshold, and so on). In some examples, the predetermined thresholds may be based at least in part on an object type (e.g., characteristics of the object type). The predetermined thresholds may represent costs associated with the selected action based on one or more factors, such as a safety factor (e.g., at-fault collisions (e.g., vehicle fault)), a comfort factor (e.g., lack of abrupt movements), a progress factor (e.g., average time to destination, delays caused by the action), an operational rules factor (e.g., following rules of the road, regulations, driving laws, etc.), or the like. In such examples, the thresholds may be determined based on costs associated with each factor. A safety cost associated with the safety factor may be based on a distance between the object and the vehicle being less than a minimum distance. In some examples the safety cost may be based on an occurrence of a vehicle-fault collision between the vehicle and the object in one of the estimated states. In such examples, the safety cost may be determined based on the vehicle action and/or a failure to perform an action to avoid the collision (e.g., accelerate, decelerate, change position (e.g., lane change, position in a lane, etc.). Additional details of example cost functions that can be used by a vehicle for planning can be found in U.S. application Ser. No. 16/555,988, filed Aug. 29, 2019, entitled "Vehicle Controller Simulations," which is incorporated herein by reference.

In various examples, the vehicle computer system 104 may determine one or more predicted object trajectories and/or one or more predicted candidate trajectories for the vehicle based on the predictions from the planning component 112 and/or the adverse prediction component 114. In some examples, the trajectories may include any number of potential paths in which the objects 106 may travel from a current position (e.g., at the time of perception) and/or based on a direction of travel. In some examples, a potential path for one of the objects 106 may include remaining stationary. In such an example, the corresponding trajectory may represent little to no motion. In some examples, the number of trajectories may vary depending on a variety of factors, such as the classification of the object (e.g., type of object), other stationary and/or dynamic objects, drivable surfaces, etc.

In various examples, the predictions by the planning component 112 and/or the adverse prediction component 114 (or respective models associated therewith) may be trained utilizing one or more machine learned algorithms. In such examples, the vehicle computer system 104 may receive the sensor data associated with the objects 106 and predict a behavior of the objects 106 based on the sensor data. For example, the vehicle computer system may be trained on captured image data of the objects 106 motion over time such that the vehicle computer system may recognize behavior that may predict future actions (e.g., candidate object trajectories) the objects 106 may take. Additionally, or in the alternative, the vehicle computer system 104 may utilize heat maps, tree search methods, and/or temporal logic formulas to determine probabilities of the first object trajectory 122 of the bicycle 106 and/or the second object trajectory 124 of the bicycle 106.

In various examples, the planning component 112 and/or the adverse prediction component 114 may utilize machine learned techniques to determine the movement of the objects 106 in the environment. In such examples, machine learned algorithms may be trained to determine movement of the objects 106 in an environment based on various input factors, such as environmental factors, weather factors, timing factors, known reactions to particular classes of objects 106 or vehicle(s) in proximity of vehicle 102, or the like.

Figure 2:
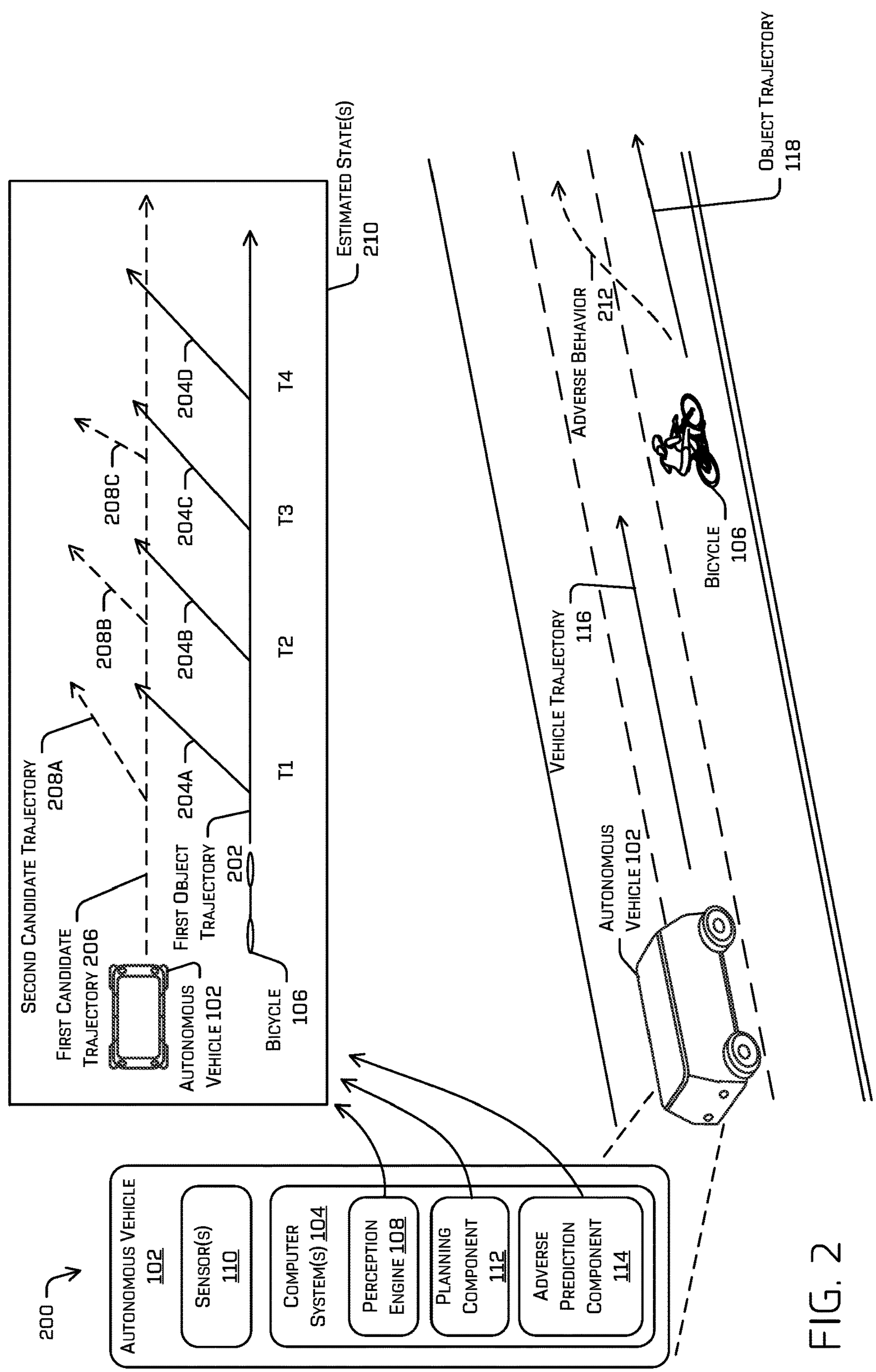
FIG. 2 is an illustration of the example environment of FIG. 1 in greater detail, in which the example vehicle applies one or more models to predict behavior for an object in the environment.

FIG. 2 is an illustration of the example environment 100 in greater detail, in which an example vehicle 102 applies different models to predict behavior for different objects and/or regions in the environment. A vehicle computer system (e.g., vehicle computer system 104) may implement the one or more models to determine candidate trajectories for the vehicle 102.

In various examples, the vehicle computer system 104 may be configured to predict behavior of the bicycle 106 in the environment 100. In various examples, the vehicle 102 may include the planning component 112 usable to control operation of the vehicle 102 and the adverse prediction component 114 usable to predict adverse behavior of the bicycle 106. In some examples, a first model associated with the planning component 112 may predict a first object trajectory 202 of the bicycle 106 at different times T1, T2, T3, and T4. Each different time may represent different estimated states 210 between the vehicle 102 and the bicycle 106. In some examples, a second model (different from the first model) associated with the adverse prediction component 114 may predict object trajectories of the bicycle 106 at different times (e.g., second object trajectories 204A, 204B, 204C, and 204D (referred to collectively as "the second object trajectories 204")). By employing the adverse prediction component 114, the first model associated with the planning component 112 may make improved predictions (e.g., candidate vehicle trajectories) regarding the likelihood that the bicycle 106 will take one of the second object trajectories 204A, 204B, 204C, or 204D. In some examples, each of the second object trajectories 204 may include any number of potential paths in which the object 106 may travel from a current position (e.g., at the time of perception) and/or based on a direction of travel.

In some examples, the first model associated with the planning component 112 may predict a first candidate trajectory 206 of the vehicle 102 and/or a second candidate trajectory 208 of the vehicle 102 at different times T1, T2, T3, and T4 (e.g., second candidate trajectories 208A, 208B, and 208C). Although not shown in FIG. 2, the first candidate trajectory 206 of the vehicle 102 may change at each time T1, T2, T3, and T4 based on the perception component 108 receiving and processing new sensor data.

In some examples, the vehicle computer system(s) 104 can generate trajectories (object trajectories and/or vehicle trajectories) at intervals, e.g., periodic intervals, as objects or conditions are identified, or the like. For instance, the vehicle computer system(s) 104 may predict actions and environmental features into the future, e.g., over some time horizon, for additional points (or times) on the trajectories. In some examples, this prediction may include updating a position of the vehicle 102 and/or objects in the environment as anticipated over time (e.g., based on controls associated with the vehicle 102 and/or based on expected positions, accelerations, velocities, etc. associated with a predicted trajectory of the vehicle and/or the objects). As a non-limiting example, such trajectories determined by the vehicle computer system(s) 104 may comprise arbitration of multiple candidate vehicle trajectories for each of 1s, 2s, 3s, and 4s (or 1m, 2m, 3m, and 4m, etc.) of future predicted vehicle travel to determine a trajectory to be followed by the vehicle 102, though any number of such points (either in time and/or in space), and any spacing between, is contemplated. In some examples, a receding horizon technique in which a period of time in the future is discretized and each time period is used to determine a single trajectory to be followed by the vehicle 102 that incorporates the potentially adverse trajectory (e.g., the second object trajectory) at every time step. In some examples, multiple trajectories (object trajectories and/or vehicle trajectories) can be substantially simultaneously generated (e.g., within technical tolerances) in accordance with a receding horizon technique, wherein one of the multiple trajectories is selected for the vehicle 102 to navigate. Additional details of controlling steering, acceleration, braking, and other systems of the vehicle is described in U.S. patent application Ser. No. 16/251,788, filed on Jan. 18, 2019, entitled "Vehicle Control," which is incorporated herein by reference.

As depicted in FIG. 2, dashed lines associated with the second candidate trajectories 208 for the vehicle 102 represent possible actions by the vehicle 102 in response to the bicycle 106 taking one of the second object trajectories 204. As illustrated in FIG. 2, from time T1 to time T2, and from time T2 to T3, the vehicle 102 may be controlled to turn more sharply to avoid the bicycle 106 (e.g., using a predetermined steering threshold, for instance). At time T4, the vehicle 102 may be sufficiently past the bicycle 106 to accelerate forward to avoid the bicycle 106 should it take the second object trajectory 204D. In some examples, braking capabilities of the vehicle may act in accordance with a predetermined braking threshold when following the first candidate trajectory 206 for the vehicle 102 and/or the second candidate trajectories 208 for the vehicle 102. For instance, harder braking may be enabled during the second candidate trajectory 208C at time T3 versus during the second candidate trajectories 208B during time T2.

As noted above, in some examples, the first candidate trajectory 206 may be associated with different acceleration, braking, and/or steering thresholds than the acceleration, braking, and/or steering thresholds associated with the second candidate trajectory 208. Each of the thresholds may corresponds to settings and/or parameters that direct a range of acceleration, braking, and/or steering capabilities available to the vehicle 102. To improve vehicle safety, acceleration, braking, and/or steering thresholds may be changed by the vehicle computer system 104 to enable the vehicle 102 to accelerate more rapidly, brake harder, and/or increase a steering angle when following the first candidate trajectory 206 and/or one of the second candidate trajectories 208. In some examples, the thresholds of the vehicle 102 may be measured by a cost function taking into account costs of various actions by the vehicle 102. In this way, the vehicle 102 may prepare for abrupt changes in direction and/or speed exhibited by an object (e.g., adverse behavior 212 of the bicycle 106) in an environment 200 of the vehicle 102.

Figure 3:
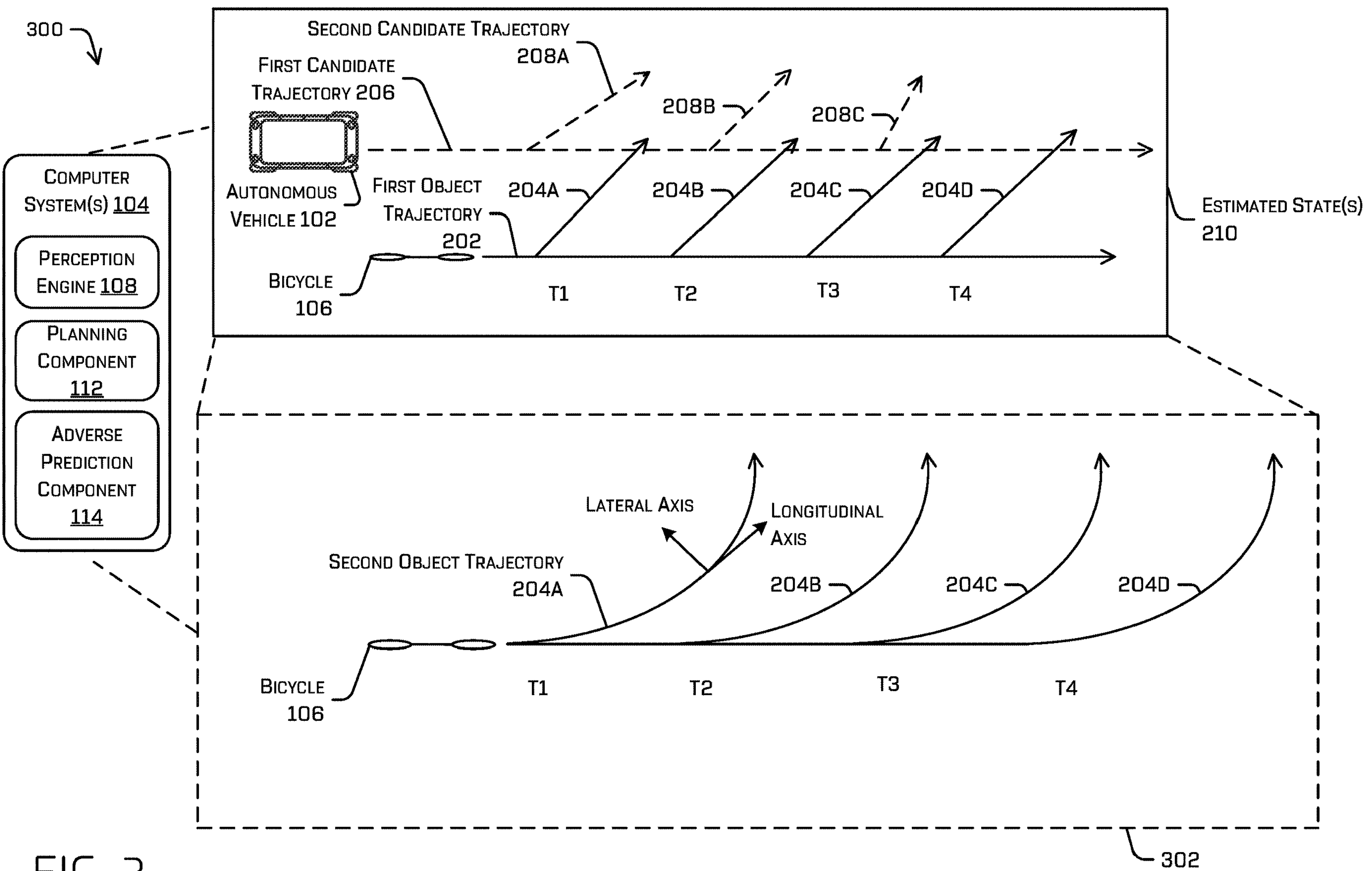
FIG. 3 is an illustration of another example environment, in which an example vehicle applies one or more models to predict behavior for an object in the environment.

FIG. 3 is an illustration of another example environment 300, in which an example vehicle applies one or more models to predict behavior for an object in the environment. A vehicle computer system (e.g., vehicle computer system 104) may implement the one or more models to determine candidate trajectories for the vehicle 102.

In various examples, the vehicle computer system (e.g., the vehicle computer system 104) may be configured to predict an adverse behavior (e.g., one or more second object trajectory(s)) of one or more objects (e.g., the bicycle 106) in the environment 300. As illustrated in FIG. 3 at 302, the second object trajectories 204 of the bicycle 106 may be based at least in part on one or more characteristics of an object type such as a maximum longitudinal acceleration about a longitudinal axis and/or a maximum lateral acceleration about a lateral axis. Thus, in some examples, the second object trajectories 204 of the bicycle 106 may be based at least in part on simple dynamics, which may prepare the vehicle 102 with a candidate trajectory even in scenarios when the object exhibits an outlier behavior that may be imperceptible to the sensors of the vehicle.

In some examples, each adverse prediction (e.g., any one of the second object trajectories 204) may be determined at a discrete time based on a current direction and/or speed of the object. For instance, as the bicycle 106 increases and/or decreases speed, an amount that the bicycle 106 is capable of turning and/or stopping also changes in varying degrees. In various examples, the adverse predictions for the bicycle 106 at each time T1, T2, T3, and T4 may be based at least in part on specific navigating capabilities of the bicycle at each respective time. In some examples, a maximum longitudinal acceleration about a longitudinal axis and/or a maximum lateral acceleration about a lateral axis may be determinized for an object at discrete times based on an object type (or characteristics of the object type that describe how the object may potentially move in the environment). In some examples, characteristics of the object type may comprise a predetermined lateral acceleration, a predetermined longitudinal acceleration, a predetermined vertical acceleration, a predetermined speed, and/or a predetermined change in direction for a given speed associated with the object type.

In various examples, the vehicle computer system 104 may switch at each time T1, T2, T3, and T4 between implementing the first candidate trajectory 206 and the second candidate trajectory 208.

In some examples, one or more models of the vehicle computer system 104 may predict future states (e.g., estimated states 210) by projecting the vehicle and object(s) forward in the environment for the period of time (e.g., 5 seconds, 8 seconds, 12 seconds, etc.). The models may project the object(s) (e.g., estimate future positions of the object(s)) forward in the environment based on a predicted trajectory (e.g., a first object trajectory) and/or an adverse trajectory (e.g., a second object trajectory) associated with the object(s). The models may project the vehicle 102 (e.g., estimate future positions of the vehicle) forward based on a vehicle trajectory associated with an action (e.g., a candidate trajectory). The estimated state(s) 210 may represent an estimated position (e.g., estimated location) of the vehicle 102 and an estimated position of the object(s) at a time in the future. In some examples, the models may determine relative data between the vehicle and the object(s) in the estimated state(s). In such examples, the relative data may include distances, locations, speeds, directions of travel, and/or other factors between the vehicle and the object. In various examples, the vehicle computer system may determine estimated states at a pre-determined rate (e.g., 10 Hertz, 20 Hertz, 50 Hertz, etc.) throughout a set of estimated states (e.g., group of estimated states representing the estimated positions of the vehicle and/or object throughout the period of time). In at least one example, the estimated states 210 may be performed at a rate of 10 Hertz (e.g., 80 estimated states over an 8 second period of time). In some examples, the models may determine estimated states 210 of the vehicle 102 and the object (bicycle 106) at various time intervals substantially in parallel. In such examples, the models may decrease a time required to generate a set of estimated states 210 over the period of time, thereby improving the functioning of the vehicle computer system 104.

Figure 4A:
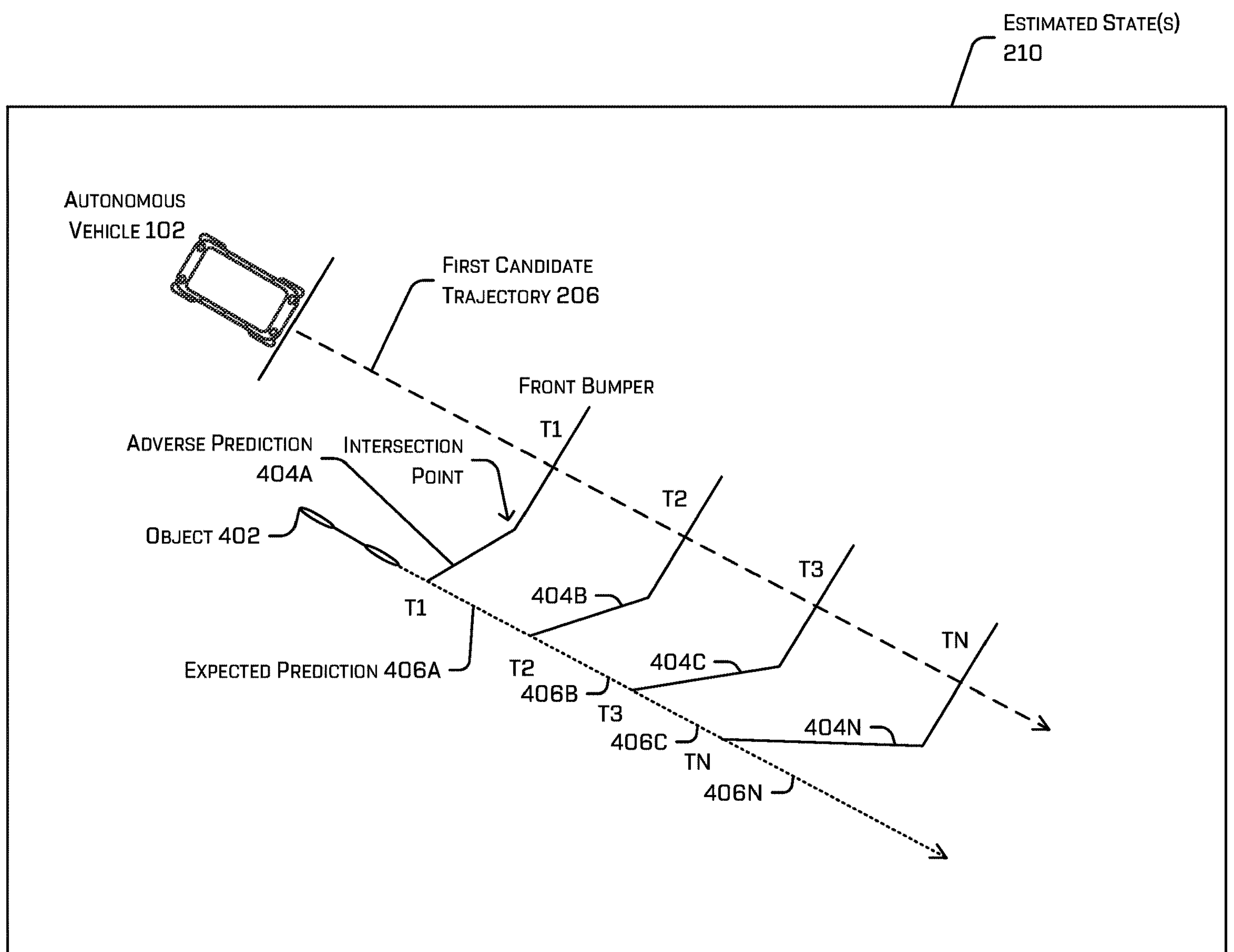
FIGS. 4A and 4B are illustrations of another example environment, in which an example vehicle applies one or more models to predict behavior for an object in the environment.
Figure 4B:
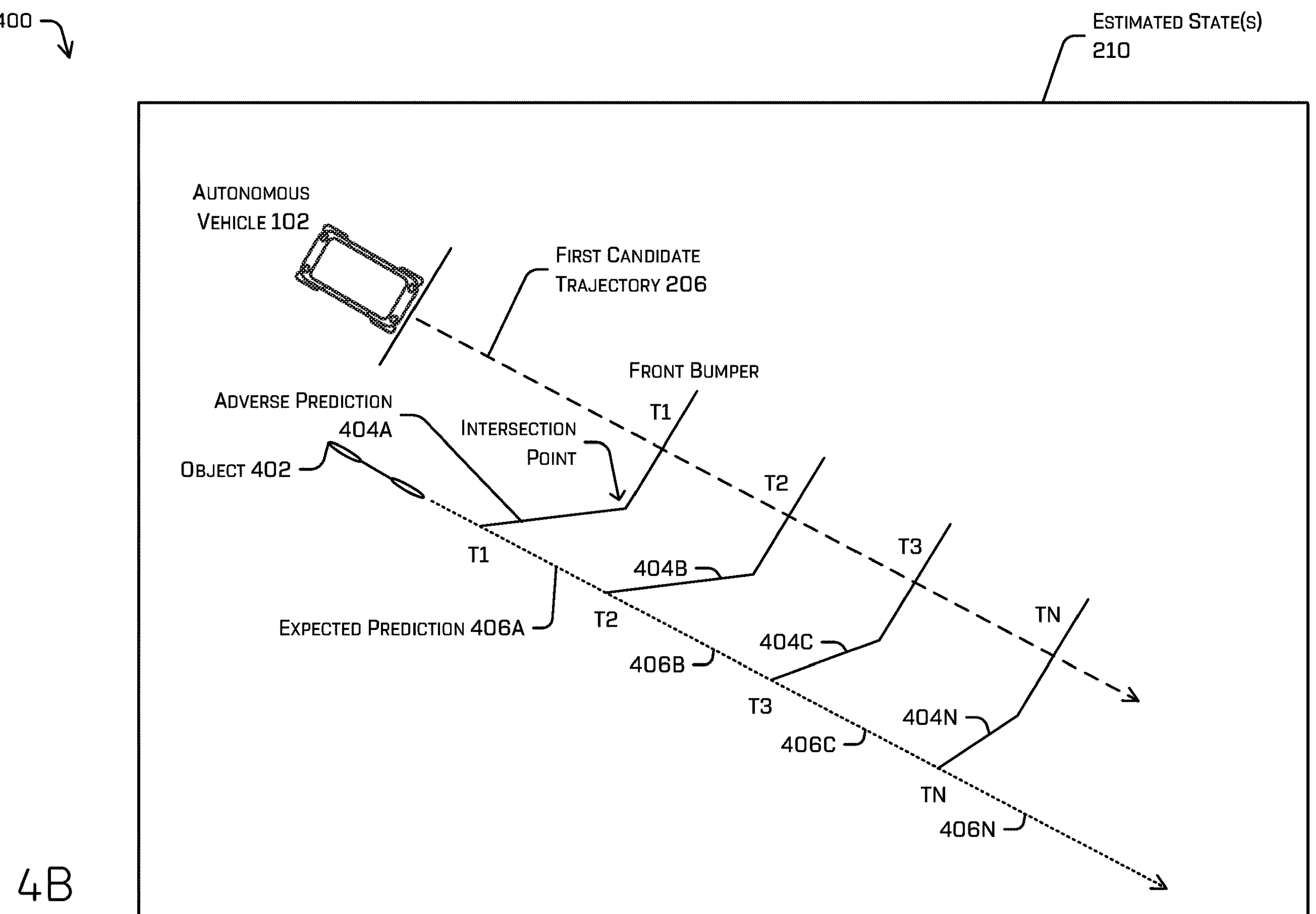

FIGS. 4A and 4B are illustrations of another example environment 400, in which an example vehicle applies one or more models to predict behavior for an object in the environment. FIG. 4A depicts example estimated states (e.g., estimated states 210) in which the example vehicle 102 approaches and then overtakes an object 402 while FIG. 4B depicts example estimated states in which the example vehicle 102 approaches and then follows (yields to) the object 402. While shown as a bicycle in this example, the object 402 may comprise any object type including a pedestrian, a bicycle, a skateboard, a scooter, a car, a pick-up truck, a semi-trailer truck, a tractor, a bus, a train, a child, an equestrian, an animal, and so on.

In various examples, the vehicle 102 may follow a first candidate trajectory 206 in the environment 400. At time T1, T2, T3, up to TN, where N can be any integer equal to or greater than 1, the front bumper of the vehicle 102 may intersect with an adverse prediction 404A, 404B, 404C, and/or 404N, where N can be any integer equal to or greater than 1, (collectively referred to as "the adverse predictions 404") at an intersection point. Generally, the object 402 may proceed along an expected prediction 406A, 406B, 406C, and/or 406N, where N can be any integer equal to or greater than 1, (e.g., one or more first object trajectories) at each discrete time, though the object may take one of the adverse predictions 404 at any time. As shown in FIG. 4A, as time increases from T1 to TN, the adverse predictions 404 increase in length to represent that the object 402 has a greater distance to travel to reach the intersection point with the front bumper of the vehicle 102. This scenario may be representative of when the vehicle approaches the object 402 and plans to follow the object 402 while preparing to follow a second candidate trajectory (not shown) at each time to help avoid the adverse predictions 404 of the object 402 from reaching the intersection point with the front bumper of the vehicle 102. For instance, as the vehicle 102 approaches the object 402, the vehicle may follow the first candidate trajectory 206 and decide whether to continue behind the object 402 or to pass the object 402. At each time T1 to TN, the vehicle 102 may predict and/or follow a new first candidate trajectory 206 that accounts for an adverse prediction 404. In some examples, the vehicle computer system 104 may predict the first candidate trajectory 206 for the vehicle 102 and/or the second candidate trajectory for the vehicle 102 based at least in part on the adverse prediction 404A at time T1, the adverse prediction 404B at time T2, and/or the adverse prediction 404C at time T3.

In the examples shown in FIGS. 4A and 4B, the distance between respective times T1 up to TN for the vehicle 102 may be different than the distance between respective times T1 up to TN for the object 402.

FIG. 4A depicts, for instance, that a distance between T1 and T2 for the vehicle 102 is a greater than a distance between T1 and T2 for the object 402 which indicates that the vehicle 102 is traveling faster than the object 402. In the example shown in FIG. 4A, at time T3, due in part to the slower speed of the object 402 relative to the speed of the vehicle 102, the adverse prediction 404C shows that the object 402 needs to travel a greater distance to reach the intersection point as compared to a distance to reach the intersection point at time T2. Thus, in the example shown in FIG. 4A, because the vehicle 102 is traveling faster than the object 402, and further because the lateral distance of the adverse predictions 404 increase with time, the vehicle 102 may be controlled by the vehicle computer 104 to safely pass the object 402.

In various examples, each adverse prediction 404 may represent a position and a velocity of the object 402 that may reach the intersection point if taken by the object 402. Changes in the adverse predictions 404 over time may result, in some examples, in the vehicle 102 deciding that it is safer to remain behind the object 402 and/or to overtake the object 402. Thus, in some examples, the vehicle computer system may predict a candidate trajectory for the vehicle with consideration to potential adverse behavior(s) thereby improving vehicle safety by providing the vehicle with a candidate trajectory that is capable of safely avoiding the potentially adverse behavior.

FIG. 4B depicts the example vehicle 102 approaching and then deciding to yield to the object 402. For example, at each time T1 to TN in FIG. 4B, the adverse predictions 404 become shorter in length to indicate that the vehicle 102 is closer to the object 402. For this reason, the object 402 may require a sharper turning radius to potentially affect operation of with the vehicle 102 at time T3 as compared to a turning radius at time T1 or time T2. In some examples, as the distance between the vehicle 102 and the object 402 continues to change over time, the vehicle 102 may at time TN implement a first candidate trajectory or a second candidate trajectory (not shown) to increase and/or decrease an amount of acceleration, braking, and/or steering to safely pass the object 402. In some examples, the object 402 may begin to diverge away from the intersection point with the vehicle 102 and/or decrease speed which may result in one of the first candidate trajectory or the second candidate trajectory for the vehicle 102 causing the vehicle 102 to overtake the object 402. Accordingly, the vehicle 102 may be associated with at least one candidate trajectory that maintains an option to yield to the object 402 and another candidate trajectory that maintains an option to overtake the object 402.

In some examples, as the lateral distance between the object 402 and the vehicle 102 decreases, the vehicle 102 may follow one of the available vehicle trajectories (e.g., the first candidate trajectory 206 and/or the second candidate trajectory 208) to plan for one of the adverse predictions 404. FIG. 4B depicts an example in which the object 402 is increasingly closer to the vehicle 102 over time while also indicating that the object 402 is travelling faster than the vehicle 102 (e.g., the distance between T2 and T3 for the object 402 is greater than a distance between T2 and T3). Thus, in this scenario, the vehicle 102 may yield to the object 402 and remain at a safe following distance while prepared to brake or decelerate in response to an adverse prediction.

While described as a separate system, in some examples, the behavior prediction techniques described herein in relation to FIGS. 1-4 may be implemented by other vehicle systems, components, and/or computing devices. For example, and as will be described in further detail with regard to FIG. 5, the behavior prediction techniques described herein in relation to FIGS. 1-4 may be implemented at least partially by or in association with a perception component, a planning component, and/or an adverse prediction component of FIG. 5.

Figure 5:
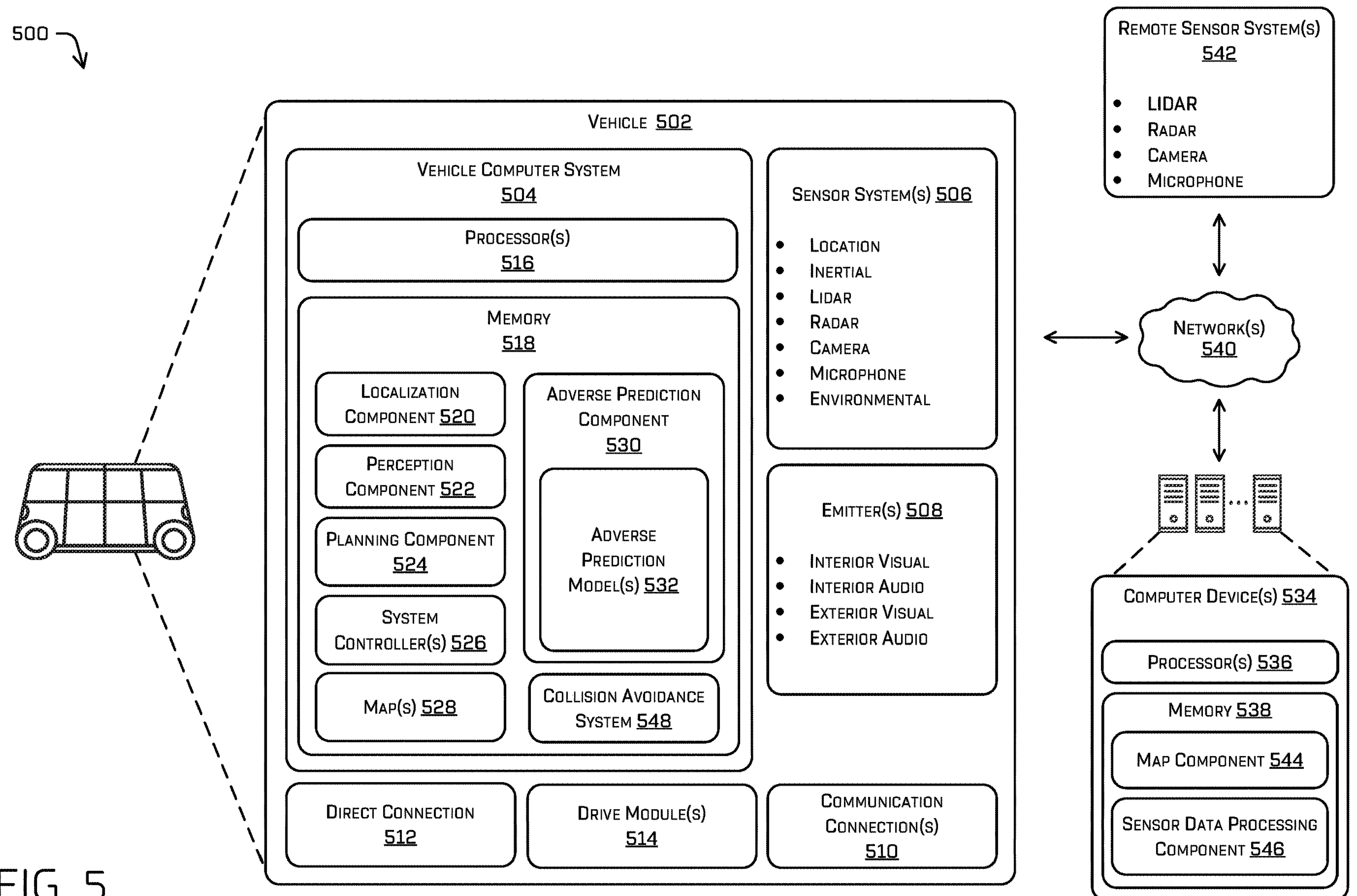
FIG. 5 is a block diagram of an example system for implementing the techniques described herein.

FIG. 5 is a block diagram of an example system 500 for implementing the techniques described herein. In at least one example, the system 500 may include a vehicle, such as vehicle 502.

The vehicle 502 may include a vehicle computer system 504, one or more sensor systems 506, one or more emitters 508, one or more communication connections 510, at least one direct connection 512, and one or more drive modules 514.

The vehicle computer system 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In various examples, the vehicle computer system 504 may store sensor data associated with actual location of an object at the end of the set of estimated states (e.g., end of the period of time) and use this data as training data to train one or more models. In some examples, the vehicle computer system 504 may provide the data to a remote computing device (i.e., computing device separate from vehicle computer system such as the computer device(s) 534) for data analysis. In such examples, the remote computer system may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference.

In the illustrated example, the memory 518 of the vehicle computer system 504 stores a localization component 520, a perception component 522, a planning component 524, one or more system controllers 526, one or more maps 528, and an adverse prediction component 530 including one or more adverse prediction model(s) 532. Though depicted in FIG. 5 as residing in the memory 518 for illustrative purposes, it is contemplated that the localization component 520, a perception component 522, a planning component 524, one or more system controllers 526, one or more maps 528, and/or the adverse prediction component 530 including the models 532 may additionally, or alternatively, be accessible to the vehicle 502 (e.g., stored on, or otherwise accessible by, memory remote from the vehicle 502, such as, for example, on memory 538 of a remote computing device 534).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528 and/or map component 544, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 may include a prediction component to generate predicted trajectories of objects (e.g., objects) in an environment and/or to generate predicted candidate trajectories for the vehicle 502. For example, a prediction component may generate one or more predicted trajectories for objects within a threshold distance from the vehicle 502. In some examples, a prediction component may measure a trace of an object and generate a trajectory for the object based on observed and predicted behavior.

In at least one example, the vehicle computer system 504 may include one or more system controllers 526, which may be configured to control steering, propulsion, braking, safety, emitters, communication, and other systems of the vehicle 502. The system controller(s) 526 may communicate with and/or control corresponding systems of the drive module(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, detect objects in an environment, generate routes, determine actions and/or trajectories to navigate within an environment.

In some examples, the one or more maps 528 may be stored on a remote computing device(s) (such as the computing device(s) 534) accessible via network(s) 540. In some examples, multiple maps 528 may be stored based on, for example, a characteristic (e.g., type of entity, time of day, day of week, season of the year, etc.). Storing multiple maps 528 may have similar memory requirements, but increase the speed at which data in a map may be accessed.

As illustrated in FIG. 5, the vehicle computer system 504 may include an adverse prediction component 530. The adverse prediction component 530 may be configured to predict behavior of one or more objects, such as objects 106 of FIG. 1, to the vehicle 502. In various examples, the adverse prediction component 530 may receive one or more features associated with the detected object(s) from the perception component 522 and/or from the sensor system(s) 506. In some examples, the adverse prediction component 530 may receive environment characteristics (e.g., environmental factors, etc.) and/or weather characteristics (e.g., weather factors such as snow, rain, ice, etc.) from the perception component 522 and/or the sensor system(s) 506. While shown separately in FIG. 5, the adverse prediction component 530 could be part of the planning component 524 or other component(s) of the vehicle 502.

In various examples, the adverse prediction component 530 may send predictions from the one or more adverse prediction models 532 that may be used by the planning component 524 to generate one or more predicted trajectories of the object (e.g., direction of travel, speed, etc.) and/or one or more predicted trajectories of the vehicle (e.g., direction of travel, speed, etc.), such as from the prediction component thereof. In some examples, the planning component 524 may determine one or more actions (e.g., reference actions and/or sub-actions) for the vehicle 502, such as vehicle candidate trajectories. In some examples, the adverse prediction component 530 may be configured to determine behavior of detected objects based at least in part on the one or more actions for the vehicle 502. In some examples, the adverse prediction component 530 may be configured to determine the actions that are applicable to the environment, such as based on environment characteristics, weather characteristics, or the like.

The adverse prediction model(s) 532 included in the adverse prediction component 530 may perform different levels of prediction processing depending upon computational resource(s), algorithm(s), and/or classifier(s) associated with a model. By processing a model to predict behavior of an object using different computational resources, algorithms, and/or classifiers, the model may provide predictions that improve safe operation of the vehicle by capturing behavior of the object with different levels of detail.

The adverse prediction component 530 may generate sets of estimated states of the vehicle and one or more detected objects forward in the environment over a time period. The adverse prediction component 530 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, the adverse prediction component 530 may utilize machine learning, linear temporal logic, tree search methods, heat maps, and/or other techniques for determining predicted trajectories and/or estimated positions of objects.

In various examples, the estimated states may be generated periodically throughout the time period. For example, the adverse prediction component 530 may generate estimated states at 0.1 second intervals throughout the time period. For another example, the adverse prediction component 530 may generate estimated states at 0.05 second intervals. The estimated states may be used by the planning component 524 in determining an action for the vehicle 502 to take in an environment.

The adverse prediction component 530 may be configured to verify a relevance of each object included in a set of estimated states (e.g., detected object, initially determined relevant object, etc.). In various examples, the adverse prediction component 530 may perform relevance verifications randomly and/or periodically throughout the time period to determine continued relevance of an object to the vehicle, including every iteration and/or as needed to free up computational resources. As discussed above, the relevance verification(s) may include a determination that an object previously determined to be relevant to the vehicle 502 will remain relevant to the vehicle at a time in the future (e.g., may occupy the same space as the vehicle 502 during the time period associated with the set of estimated states). In various examples, the adverse prediction component 530 may compare an estimated position of the vehicle 502 in an estimated state to an estimated position of an object in the estimated state. In some examples, predictions from the adverse prediction component 530 and/or predictions from the planning component 524 may be determined based at least in part on techniques for generating trajectories to control a vehicle, additional details for which are described in U.S. patent application Ser. No. 15/632,208, filed Jun. 23, 2017, entitled "Trajectory Generation and Execution Architecture," which is incorporated herein by reference.

In various examples, the adverse prediction component 530 may utilize machine learned techniques to predict behavior of a detected object(s). In such examples, the machine learned algorithms may be trained to determine, based on sensor data and/or previous predictions by the model, that an object is likely to behave in a particular way relative to the vehicle 502 at a particular time during a set of estimated states (e.g., time period). In such examples, one or more of the vehicle 502 state (position, velocity, acceleration, trajectory, etc.) and/or the object state, classification, etc. may be input into such a machine learned model and, in turn, a behavior prediction may be output by the model.

In some examples, the adverse prediction component 530 may output a prediction representative of an outlier object behavior based on one or more characteristics of an object or object type. In various examples, characteristics associated with each object type may be used by the adverse prediction component 530 to determine an object trajectory. Examples of characteristics of an object type may include, but not be limited to: a maximum longitudinal acceleration, a maximum lateral acceleration, a maximum vertical acceleration, a maximum speed, maximum change in direction for a given speed, and the like. The object trajectory determined from one or more of the characteristics of the object type may be based on simple dynamics of the object type. By determining adverse predictions based on simple dynamics, adverse scenarios that may occur in the future may be generalized to include scenarios not seen before by the object and/or scenarios that may be imperceptible to the sensors of the vehicle.

By basing predictions on simple dynamics, the adverse prediction component 530 may increase an amount of memory and processing power available to the vehicle computer system 504 for other calculations, programs, applications, etc. In some examples, determining an adverse prediction using the techniques described herein may increase processing speed related to predicting subsequent vehicle candidate trajectories in the environment. Accordingly, the techniques described herein may improve the functioning of the vehicle computer system.

As can be understood, the components discussed herein (e.g., the localization component 520, the perception component 522, the planning component 524, the one or more system controllers 526, the one or more maps 528, the adverse prediction component 530 including the adverse prediction model(s) 532 are described as divided for illustrative purposes. However, the operations performed by the various components may be combined or performed in any other component.

While examples are given in which the techniques described herein are implemented by a planner component and/or an adverse prediction component of the vehicle, in some examples, some or all of the techniques described herein could be implanted by another system of the vehicle, such as a Collision Avoidance System (e.g., collision avoidance system 548) (and/or output of which may be conveyed to such a system for use thereby). Generally, the collision avoidance system 548 may include a primary system for controlling the vehicle 502 and a secondary system that operates on the vehicle 502 to validate operation of the primary system and to control the vehicle 502 to avoid collisions. Additional details of a collision avoidance system is described in U.S. patent application Ser. No. 16/218,182, filed on Dec. 12, 2018, entitled "Collision Avoidance System with Trajectory Validation," which is incorporated herein by reference.

In some examples, different latency threshold(s) (e.g., an amount of time to detect, plan, and implement a reaction to an event occurring in real-time) may be associated with different components of the vehicle computer system. For instance, the planning component 524, the adverse prediction component 530, and/or the collision avoidance system 548 may be associated with different latency thresholds (e.g., the collision avoidance system 548 may have a shorter latency from detecting an event in an environment to executing a control action at the vehicle as compared to a latency associated with the planning component 524). By way of example and not limitation, latency to implement a trajectory by the collision avoidance system 548 may be milliseconds faster than a latency to implement the threshold by the planning component 524. In general, the vehicle computer system 504 may implement one or more trajectories according to different latency thresholds to improve an amount of time from noticing an adverse behavior to executing the one or more trajectories that respond to the adverse behavior. In this way, the vehicle 502 may maintain a maximum speed while still being able to yield and/or overtake an object in the environment.

In some instances, aspects of some or all of the components discussed herein may include any models, techniques, and/or machine learned techniques. For example, in some instances, the components in the memory 518 (and the memory 538, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computer system 504. Additionally, or in the alternative, the sensor system(s) 506 may send sensor data, via the one or more networks 540, to the one or more computing device(s) 534 at a particular frequency, after a lapse of a predetermined period of time, in near real-time, etc.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive module(s) 514. Also, the communication connection(s) 510 may allow the vehicle to communicate with other nearby computing device(s) (e.g., remote computing device 534, other nearby vehicles, etc.) and/or one or more remote sensor system(s) 542 for receiving sensor data. The communications connection(s) 510 also enable the vehicle 502 to communicate with a remote teleoperations computing device or other remote services.

The communications connection(s) 510 may include physical and/or logical interfaces for connecting the vehicle computer system 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive modules 514. In some examples, the vehicle 502 may have a single drive module 514. In at least one example, if the vehicle 502 has multiple drive modules 514, individual drive modules 514 may be positioned on opposite ends of the vehicle 502 (e.g., the front and the rear, etc.). In at least one example, the drive module(s) 514 may include one or more sensor systems to detect conditions of the drive module(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive module(s) 514. In some cases, the sensor system(s) on the drive module(s) 514 may overlap or supplement corresponding systems of the vehicle 502 (e.g., sensor system(s) 506).

The drive module(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 514. Furthermore, the drive module(s) 514 may also include one or more communication connection(s) that enable communication by the respective drive module with one or more other local or remote computing device(s).

In at least one example, the direct connection 512 may provide a physical interface to couple the one or more drive module(s) 514 with the body of the vehicle 502. For example, the direct connection 512 may allow the transfer of energy, fluids, air, data, etc. between the drive module(s) 514 and the vehicle. In some instances, the direct connection 512 may further releasably secure the drive module(s) 514 to the body of the vehicle 502.

In at least one example, the localization component 520, the perception component 522, the planning component 524, the one or more system controllers 526, the one or more maps 528, and the adverse prediction component 530, may process sensor data, as described above, and may send their respective outputs, over the one or more network(s) 540, to the computing device(s) 534. In at least one example, the localization component 520, the perception component 522, the planning component 524, the one or more system controllers 526, the one or more maps 528, and the adverse prediction component 530 may send their respective outputs to the remote computing device(s) 534 at a particular frequency, after a lapse of a predetermined period of time, in near real-time, etc.

In some examples, the vehicle 502 may send sensor data to the computing device(s) 534 via the network(s) 540. In some examples, the vehicle 502 may receive sensor data from the computing device(s) 534 and/or remote sensor system(s) 542 via the network(s) 540. The sensor data may include raw sensor data and/or processed sensor data and/or representations of sensor data. In some examples, the sensor data (raw or processed) may be sent and/or received as one or more log files.

The computing device(s) 534 may include processor(s) 536 and a memory 538 storing the map component 544 and a sensor data processing component 546. In some examples, the map component 544 may include functionality to generate maps of various resolutions. In such examples, the map component 544 may send one or more maps to the vehicle computer system 504 for navigational purposes. In various examples, the sensor data processing component 546 may be configured to receive data from one or more remote sensors, such as sensor system(s) 506 and/or remote sensor system(s) 542. In some examples, the sensor data processing component 546 may be configured to process the data and send processed sensor data to the vehicle computer system 504, such as for use by the adverse prediction component 530

(e.g., the adverse prediction model(s) 532). In some examples, the sensor data processing component 546 may be configured to send raw sensor data to the vehicle computer system 504.

The processor(s) 516 of the vehicle 502 and the processor(s) 536 of the computing device(s) 534 may be any suitable processor capable of executing instructions to process data and perform operations as described herein. By way of example and not limitation, the processor(s) 516 and 536 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 538 are examples of non-transitory computer-readable media. The memory 518 and memory 538 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 and memory 538 may include at least a working memory and a storage memory. For example, the working memory may be a high-speed memory of limited capacity (e.g., cache memory) that is used for storing data to be operated on by the processor(s) 516 and 536. In some instances, the memory 518 and memory 538 may include a storage memory that may be a lower-speed memory of relatively large capacity that is used for long-term storage of data. In some cases, the processor(s) 516 and 536 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 may be associated with the computing device(s) 534 and/or components of the computing device(s) 534 may be associated with the vehicle 502. That is, the vehicle 502 may perform one or more of the functions associated with the computing device(s) 534, and vice versa.

Figure 6:
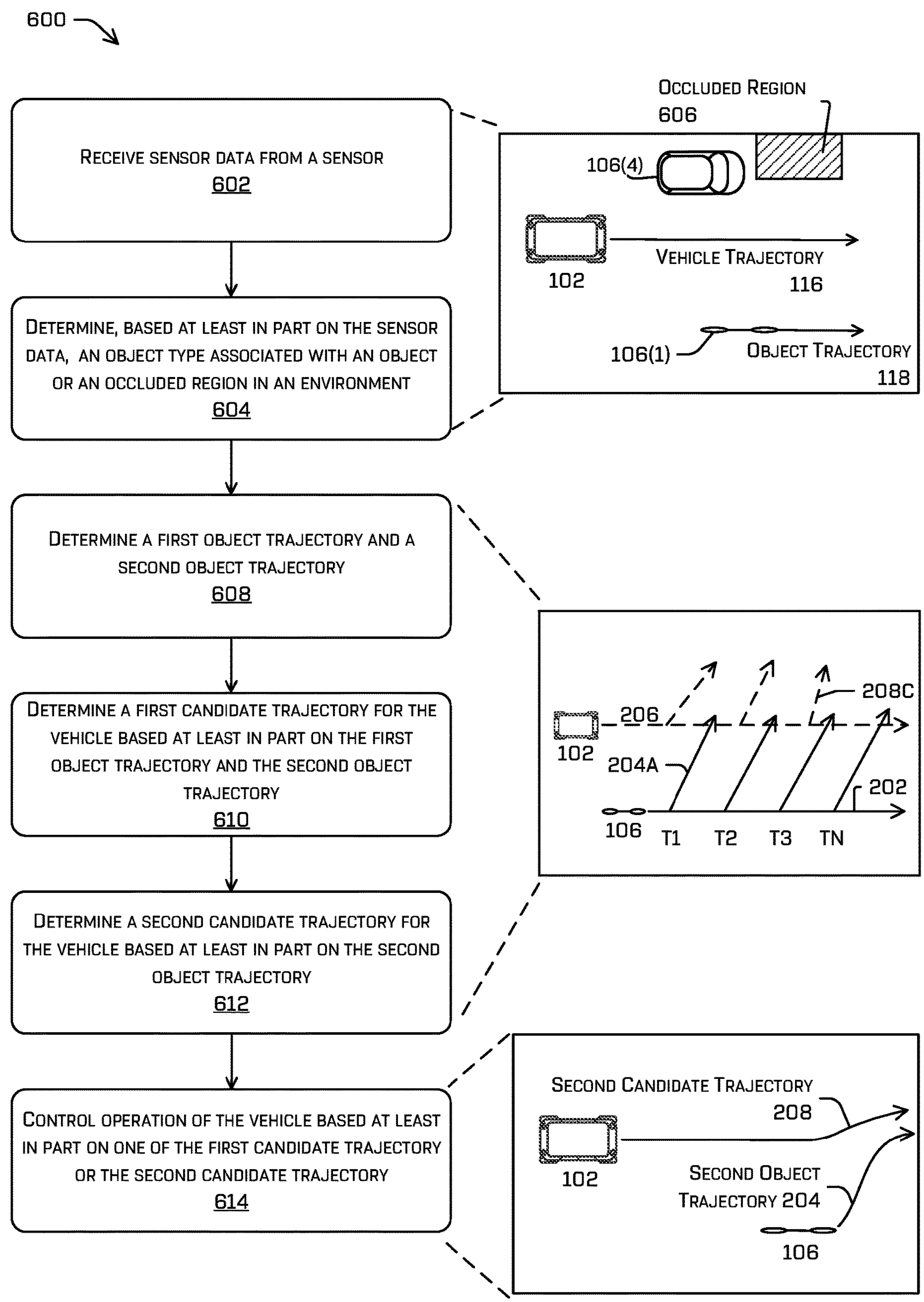
FIG. 6 is a flowchart depicting an example process for predicting behavior of an object using one or more models.

FIG. 6 illustrates an example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 6 is a flowchart depicting an example process 600 for predicting behavior of objects using one or more models. Some or all of the process 600 may be performed by one or more components in FIG. 5, as described herein. For example, some or all of process 600 may be performed by the vehicle computer system 504.

At operation 602, the process may include receiving sensor data from a sensor of a vehicle. The vehicle computer system may be configured to receive sensor data representing one or more objects in an environment. The sensor data may be received from one or more sensors on the vehicle and/or from one or more remote sensors. In some examples, the vehicle computer system may be configured to detect dynamic objects and/or static objects and combine the associated sensor data with map data. In some examples, the map data may represent fixed features of an environment including but not limited to crosswalks, traffic signals, school zones, and the like. In some examples, objects may be detected utilizing one or more heat maps. In various examples, the objects may be detected utilizing machine learned techniques. In such examples, one or more machine learned algorithms may be trained to detect objects based on sensor data. In some examples, the objects may be detected utilizing temporal logic, and/or tree search methods.

At operation 604, the process may include determining, based at least in part on the sensor data, an object type associated with an object or an occluded region in an environment. In some examples, the vehicle computer system may be configured to semantically classify the detected objects (e.g., determine an object type). A classification may include another vehicle (e.g., car, a pick-up truck, a semi-trailer truck, a tractor, a bus, a train, etc.), a pedestrian, a child, a bicyclist, a skateboarder, an equestrian, an animal, or the like. For example, the vehicle computer system 104 may detect object 106(4) and classify the object 106(4) as a vehicle and may detect object 106(1) and classify the object 106(1) as a bicycle. In various examples, the classification of the object may be used by a model to determine object trajectories. In this way, potential actions by the object may be considered based on characteristics of the object (e.g., how the object may potentially move in the environment). As shown in FIG. 6, the vehicle 106(4) may cause an occluded region 606. Additional details of determining an occluded region in an environment are described in U.S. patent application Ser. No. 16/011,436, filed Jun. 18, 2018, entitled "Occlusion Aware Planning and Control," which is incorporated herein by reference.

In various examples, detected objects may be taken into account in operations (e.g., estimated states (or simulations), interaction modeling, collision estimation, etc.) or other vehicle control planning operation at a first time and/or at a second time when the objects may change location, speed, and/or direction. For the purposes of this discussion, operations such as an estimated state may include predicted locations of a vehicle and one or more objects at a particular time in the future (e.g., time after a current/initial time).

In at least some examples, an object detection may comprise a detection of an occluding area (which may or may not include an object). For instance, in examples when the vehicle computer system detects an occluded region (e.g., occluded region 606), the associated object type may comprise a potential object type that may emerge from the occluded region. By way of example and not limitation, when an occluded region is near a crosswalk, the object type may be a pedestrian whereas when the occluded region is near an intersection, the object type may be a vehicle. Thus, the vehicle computer system may select an object type for the occluded region based on a context of the occluded region relative to another static object (e.g., building, row of parked cars, and so on) and/or dynamic object. In some examples, a potential object type may be associated with the occluded region to predict an adverse behavior for the potential object. In various examples, the potential object may be assigned a trajectory that represents characteristics of the object type (e.g., a maximum acceleration for a pedestrian). The occluded region may also or instead be associated with a predetermined trajectory that indicates a speed and direction for a potential object to impact the vehicle without being associated with an object type. In some examples, the object trajectory and/or the predetermined trajectory associated with an occluded region may be determined based at least in part on characteristics of an object type associated with the occluded region. In various examples, the object type for an occluded region, may be based at least in part on a proximity of the occluded region to a crosswalk, a row of parked cars, a narrow road, an intersection, or a school zone, to just name a few.

At operation 608, the process may include determining a first object trajectory and a second object trajectory. For instance, a first model (e.g., an adverse prediction model 532) may predict adverse behavior of the objects in the environment. In general, the predicted behavior by the first model may represent future positions of the object and the vehicle over a time period. The predicted behavior (e.g., plurality of estimated states) may be generated randomly and/or periodically throughout the time period. For example, prediction may be generated every 0.1 seconds throughout the time period. A first object trajectory may represent, for example, a predicted trajectory most likely taken by the object at a point in time while a second object trajectory may represent the adverse prediction (e.g., an adverse trajectory most likely to affect operation of the vehicle at the point in time). For instance, in examples when the object is a pedestrian, the first object trajectory may indicate that the pedestrian will likely continue along a current path and the second object trajectory may indicate that the pedestrian may suddenly change direction towards the vehicle while also increasing a rate of speed. Thus, in various examples, the first object trajectory may have a higher likelihood of occurrence than the second object trajectory and/or the second object trajectory may have a higher magnitude of impact to operation of the vehicle than the first object trajectory. In some examples, the first object trajectory and/or the second object trajectory may be determined based at least in part on a top-down prediction. Additional details of determining predictions based on a top-down representation of an environment and vehicle action(s) are described in U.S. patent application Ser. No. 16/504,147, filed Jul. 5, 2019, entitled "Prediction of Top-Down Scenes based on Action Data," which is incorporated herein by reference.

By way of example and not limitation, the adverse prediction model may predict a trajectory for an object based at least in part on characteristics of the object (e.g., maximum acceleration, maximum turning ability at a given speed, and so on). Thus, an output from the adverse prediction model may improve vehicle safety by providing the vehicle with an adverse possibility that the object may take which enables the car to prepare for an adverse behavior (e.g., the maximum turning ability and/or the maximum acceleration of an object).

In examples where an object was not detected, but an occluded region was detected, the vehicle computer system may determine a single object trajectory for the occluded region that represents a potential adverse behavior that may occur relative to the occluded region. In some examples, the object trajectory (e.g., the second object trajectory) may be based at least in part on a potential object type (and the characteristics thereof), while in other examples the object trajectory for the occluded region may be based at least in part on a predetermined trajectory that indicates a speed and direction for a potential object that may emerge from the occluded region.

In some examples, the first object trajectory may comprise a predicted trajectory most likely to be taken by an object or a potential object associated with an occluded region at a point in time and the second object trajectory may comprise a trajectory most likely to impact operation of a vehicle traversing an environment at the point in time.

At operation 610, the process may include determining a first candidate trajectory for the vehicle based at least in part on the first object trajectory and the second object trajectory. In various examples, determining the first candidate trajectory for the vehicle may be performed by a system of a vehicle, such as the planning component 524 or the adverse prediction component 530. In some examples, a same model may determine the first candidate trajectory for the vehicle, the first object trajectory and the second object trajectory. In some examples, an output by the adverse prediction model 532 may be shared with the planning component 524 for determining the first candidate trajectory for the vehicle.

At operation 612, the process may include determining a second candidate trajectory for the vehicle based at least in part on the second object trajectory. In various examples, determining the second candidate trajectory for the vehicle may be performed by a system of a vehicle, such as the planning component 524 or the adverse prediction component 530. Generally, the second candidate trajectory represents a higher magnitude of impact to operation of the vehicle than the first candidate trajectory. In some examples, the second candidate trajectory is less likely to occur than the first candidate trajectory. By way of example and not limitation, the adverse prediction model may predict a trajectory for a bicycle based at least in part on characteristics of the bicycle (e.g., maximum acceleration, maximum turning ability at a given speed, and so on). In such an example, the vehicle computer system may predict a candidate trajectory for the vehicle (using a same or different model) with consideration to an output from the adverse prediction model thereby improving vehicle safety by providing the vehicle with a candidate trajectory that identifies and prepares for an adverse behavior (e.g., the maximum turning ability and/or the maximum acceleration of the bicycle).

At operation 614, the process may include controlling operation of the vehicle based at least in part on the first candidate trajectory for the vehicle or the second candidate trajectory for the vehicle. In various examples, controlling operation of the vehicle may be performed by a system of a vehicle, such as the planning component 524. The vehicle computer system may determine a candidate trajectory for the vehicle that is based at least in part on the predicted adverse behavior of the object, thereby improving vehicle safety by planning for the possibility that the object may perform the adverse behavior at a point in time.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operations 604 and 608 may be performed without operations 610, 612, and/or 614. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: a sensor associated with a vehicle traversing an environment; one or more processors; and non-transitory computer-readable storage media storing instructions that, when executed by the one or more processors, cause the system to perform operations comprising: receiving sensor data from the sensor; determining, based at least in part on the sensor data, an object type associated with an object or an occluded region in the environment; determining a first object trajectory and a second object trajectory wherein the first object trajectory comprises a predicted trajectory most likely to be taken by the object or a potential object associated with the occluded region at a point in time and the second object trajectory comprises a trajectory most likely to impact operation of the vehicle at the point in time; determining a first candidate trajectory for the vehicle based at least in part on the first object trajectory and the second object trajectory; determining a second candidate trajectory for the vehicle based at least in part on the second object trajectory; and controlling operation of the vehicle based at least in part on one of the first candidate trajectory or the second candidate trajectory.

B: A system as paragraph A describes, wherein: the first object trajectory comprises a first likelihood of occurrence and a first magnitude of impact to operation of the vehicle, the second object trajectory comprises a second likelihood of occurrence and a second magnitude of impact to operation of the vehicle, and the first likelihood of occurrence is greater than the second likelihood of occurrence and the second magnitude of impact to operation of the vehicle is greater than the first magnitude of impact to operation of the vehicle.

C: A system as paragraphs A or B describe, wherein determining the second object trajectory is based at least in part on the object type of the object or the object type of the potential object associated with the occluded region.

D: A system as paragraphs A-C describe, wherein determining the second object trajectory is based at least in part on a maximum lateral acceleration or a maximum longitudinal acceleration associated with the object type of the object or the occluded region.

E: A system as paragraphs A-D describe, wherein determining the first object trajectory is based at least in part on a first output by a machine learned model and the second object trajectory is based at least in part on a second output by a kinematic model, the first output different from the second output.

F: A non-transitory computer-readable storage media storing instructions that, when executed, cause one or more processors to perform operations comprising: receiving sensor data from a sensor; determining, based at least in part on the sensor data, an object type associated with an object or an occluded region in an environment; determining a first object trajectory and a second object trajectory, wherein the first object trajectory comprises a predicted trajectory most likely to be taken by the object or a potential object associated with the occluded region at a point in time and the second object trajectory comprises a trajectory most likely to impact operation of the vehicle at the point in time; determining a candidate trajectory for a vehicle based at least in part on the first object trajectory and the second object trajectory; and controlling operation of the vehicle based at least in part on one of the candidate trajectory.

G: A non-transitory computer-readable storage media as paragraph F describes, wherein the candidate trajectory comprises a first candidate trajectory and further comprising determining a second candidate trajectory for the vehicle based at least in part of the second object trajectory and wherein: the first object trajectory comprises a first likelihood of occurrence and a first magnitude of impact to operation of the vehicle, the second object trajectory comprises a second likelihood of occurrence and a second magnitude of impact to operation of the vehicle, and the first likelihood of occurrence is greater than the second likelihood of occurrence and the second magnitude of impact to operation of the vehicle is greater than the first magnitude of impact to operation of the vehicle.

H: A non-transitory computer-readable storage media as paragraphs F or G describe, wherein determining the second object trajectory is based at least in part on the object type of the object or the object type of the potential object associated with the occluded region.

I: A non-transitory computer-readable storage media as paragraphs F-H describe, wherein determining the second object trajectory is based at least in part on a predetermined lateral acceleration or a predetermined longitudinal acceleration associated with the object type of the object.

J: A non-transitory computer-readable storage media as paragraphs F-I describe, wherein determining the first object trajectory is based at least in part on a first output by a first model and the second object trajectory is based at least in part on a second output by a second model, the first output different from the second output and the second model different from the first model.

K: A non-transitory computer-readable storage media as paragraphs F-J describe, wherein: the first model comprises a machine learned model, and the second model comprises a tree model based at least in part on one or more characteristics associated with the object type of the object.

L: A non-transitory computer-readable storage media as paragraphs F-K describe, wherein the one or more characteristics associated with the object type comprise a predetermined lateral acceleration, a predetermined longitudinal acceleration, a predetermined vertical acceleration, a predetermined speed, or a predetermined change in direction for a given speed.

M: A non-transitory computer-readable storage media as paragraphs F-L describe, wherein the first object trajectory comprises a first braking threshold or a first acceleration threshold different from a second braking threshold or a second acceleration threshold associated with the second object trajectory.

N: A non-transitory computer-readable storage media as paragraphs F-M describe, wherein the object type comprises a pedestrian, a bicycle, a skateboard, a scooter, a car, a pick-up truck, a semi-trailer truck, a tractor, a bus, a train, a child, an equestrian, or an animal.

O: A method comprising: receiving sensor data from a sensor; determining, based at least in part on the sensor data, an object type associated with an object or an occluded region in an environment; determining a first object trajectory and a second object trajectory, wherein the first object trajectory comprises a predicted trajectory most likely to be taken by the object or a potential object associated with the occluded region at a point in time and the second object trajectory comprises a trajectory most likely to impact operation of the vehicle at the point in time; determining a candidate trajectory for a vehicle based at least in part on the first object trajectory and the second object trajectory; and controlling operation of the vehicle based at least in part on one of the candidate trajectory.

P: A method of paragraph O describes, wherein the candidate trajectory comprises a first candidate trajectory and further comprising determining a second candidate trajectory for the vehicle based at least in part of the second object trajectory and wherein: the first object trajectory comprises a first likelihood of occurrence and a first magnitude of impact to operation of the vehicle, the second object trajectory comprises a second likelihood of occurrence and a second magnitude of impact to operation of the vehicle, and the first likelihood of occurrence is greater than the second likelihood of occurrence and the second magnitude of impact to operation of the vehicle is greater than the first magnitude of impact to operation of the vehicle.

Q: A method of paragraphs O or P describe, wherein determining the second object trajectory is based at least in part on the object type of the object or the object type of the potential object associated with the occluded region.

R: A method of paragraphs O-Q describe, wherein determining the second object trajectory is based at least in part on a predetermined lateral acceleration or a predetermined longitudinal acceleration associated with the object type of the object or the occluded region.

S: A method of paragraphs O-R describe, wherein determining the first object trajectory is based at least in part on a first output by a first model and the second object trajectory is based at least in part on a second output by a second model, the first output different from the second output and the second model different from the first model.

T: A method of paragraphs O-S describe, wherein the second object trajectory comprises one or more of a braking threshold of the object or an acceleration threshold of the object absent from the first object trajectory.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

a sensor associated with a vehicle traversing an environment;

one or more processors; and non-transitory computer-readable storage media storing instructions that, when executed by the one or more processors, cause the system to perform operations comprising:

receiving sensor data from the sensor;

determining, based at least in part on the sensor data, an object type of a potential object associated with an occluded region in the environment;

determining a first object trajectory, wherein the first object trajectory comprises a predicted trajectory most likely to be taken by the potential object associated with the occluded region at a point in time;

determining a second object trajectory, wherein the second object trajectory comprises a trajectory associated with an adverse action of the potential object that has potential to most impact operation of the vehicle at the point in time, wherein the second object trajectory is different from the first object trajectory;

determining a first candidate trajectory for the vehicle based at least in part on the first object trajectory;

determining a second candidate trajectory for the vehicle based at least in part on the second object trajectory, wherein the second candidate trajectory is different from the first candidate trajectory; and controlling operation of the vehicle, wherein controlling operation of the vehicle comprises:

if the potential object is not performing the adverse action, controlling operation of the vehicle based on the first candidate trajectory; and else if the potential object is performing the adverse action, controlling operation of the vehicle based on the second candidate trajectory.

2. The system of claim 1, wherein:

the first object trajectory comprises a first likelihood of occurrence and a first magnitude of impact to operation of the vehicle, the second object trajectory comprises a second likelihood of occurrence and a second magnitude of impact to operation of the vehicle, and the first likelihood of occurrence is greater than or equal to the second likelihood of occurrence and the second magnitude of impact to operation of the vehicle is greater than or equal to the first magnitude of impact to operation of the vehicle.

3. The system of claim 1, wherein determining the second object trajectory is based at least in part on the object type of the potential object associated with the occluded region.

4. The system of claim 1, wherein determining the second object trajectory is based at least in part on a maximum lateral acceleration or a maximum longitudinal acceleration associated with the object type of the potential object associated with the occluded region.

5. The system of claim 1, wherein determining the first object trajectory is based at least in part on a first output by a machine learned model and the second object trajectory is based at least in part on a second output by a kinematic model, the first output different from the second output.

6. A non-transitory computer-readable storage media storing instructions that, when executed, cause one or more processors to perform operations comprising:

receiving sensor data from a sensor associated with a vehicle;

determining, based at least in part on the sensor data, an object type of a potential object associated with an occluded region in an environment;

determining a first object trajectory, wherein the first object trajectory comprises a predicted trajectory most likely to be taken by the potential object associated with the occluded region at a point in time;

determining a second object trajectory, wherein the second object trajectory comprises a trajectory associated with an adverse action of the potential object that has potential to most impact operation of the vehicle at the point in time, wherein the second object trajectory is different from the first object trajectory;

determining a first candidate trajectory for the vehicle based at least in part on the first object trajectory;

determining a second candidate trajectory for the vehicle based at least in part on the second object trajectory, wherein the second candidate trajectory is different from the first candidate trajectory; and controlling operation of the vehicle, wherein controlling operation of the vehicle comprises:

if the potential object is not performing the adverse action, controlling operation of the vehicle based on the first candidate trajectory; and else if the potential object is performing the adverse action, controlling operation of the vehicle based on the second candidate trajectory.

7. The non-transitory computer-readable storage media of claim 6, wherein:

the first object trajectory comprises a first likelihood of occurrence and a first magnitude of impact to operation of the vehicle, the second object trajectory comprises a second likelihood of occurrence and a second magnitude of impact to operation of the vehicle, and the first likelihood of occurrence is greater than or equal to the second likelihood of occurrence and the second magnitude of impact to operation of the vehicle is greater than or equal to the first magnitude of impact to operation of the vehicle.

8. The non-transitory computer-readable storage media of claim 6, wherein determining the second object trajectory is based at least in part on the object type of the potential object associated with the occluded region.

9. The non-transitory computer-readable storage media of claim 6, wherein determining the second object trajectory is based at least in part on a predetermined lateral acceleration or a predetermined longitudinal acceleration associated with the object type of the potential object associated with the occluded region.

10. The non-transitory computer-readable storage media of claim 6, wherein determining the first object trajectory is based at least in part on a first output by a first model and the second object trajectory is based at least in part on a second output by a second model, the first output different from the second output and the second model different from the first model.

11. The non-transitory computer-readable storage media of claim 10, wherein:

the first model comprises a machine learned model, and the second model comprises a tree model based at least in part on one or more characteristics associated with the object type of the potential object associated with the occluded region.

12. The non-transitory computer-readable storage media of claim 11, wherein the one or more characteristics associated with the object type comprise a predetermined lateral acceleration, a predetermined longitudinal acceleration, a predetermined vertical acceleration, a predetermined speed, or a predetermined change in direction for a given speed.

13. The non-transitory computer-readable storage media of claim 6, wherein the first candidate trajectory comprises a first braking threshold or a first acceleration threshold different from a second braking threshold or a second acceleration threshold associated with the second candidate trajectory.

14. The non-transitory computer-readable storage media of claim 6, wherein the object type comprises a pedestrian, a bicycle, a skateboard, a scooter, a car, a pick-up truck, a semi-trailer truck, a tractor, a bus, a train, a child, an equestrian, or an animal.

15. A method comprising:

receiving sensor data from a sensor associated with a vehicle;

determining, based at least in part on the sensor data, an object type of a potential object associated with an occluded region in an environment;

determining a first object trajectory, wherein the first object trajectory comprises a predicted trajectory most likely to be taken by the potential object associated with the occluded region at a point in time;

determining a second object trajectory, wherein the second object trajectory comprises a trajectory associated with an adverse action of the potential object that has potential to most impact operation of the vehicle at the point in time, wherein the second object trajectory is different from the first object trajectory;

determining a first candidate trajectory for the vehicle based at least in part on the first object trajectory;

determining a second candidate trajectory for the vehicle based at least in part on the second object trajectory, wherein the second candidate trajectory is different from the first candidate trajectory; and controlling operation of the vehicle, wherein controlling operation of the vehicle comprises:

if the potential object is not performing the adverse action, controlling operation of the vehicle based on the first candidate trajectory; and else if the potential object is performing the adverse action, controlling operation of the vehicle based on the second candidate trajectory.

16. The method of claim 15, wherein:

the first object trajectory comprises a first likelihood of occurrence and a first magnitude of impact to operation of the vehicle, the second object trajectory comprises a second likelihood of occurrence and a second magnitude of impact to operation of the vehicle, and the first likelihood of occurrence is greater than or equal to the second likelihood of occurrence and the second magnitude of impact to operation of the vehicle is greater than or equal to the first magnitude of impact to operation of the vehicle.

17. The method of claim 15, wherein determining the second object trajectory is based at least in part on the object type of the potential object associated with the occluded region.

18. The method of claim 15, wherein determining the second object trajectory is based at least in part on a predetermined lateral acceleration or a predetermined longitudinal acceleration associated with the object type of the potential object associated with the occluded region.

19. The method of claim 15, wherein determining the first object trajectory is based at least in part on a first output by a first model and the second object trajectory is based at least in part on a second output by a second model, the first output different from the second output and the second model different from the first model.

20. The method of claim 15, wherein the second candidate trajectory comprises one or more of a braking threshold of the potential object or an acceleration threshold of the potential object absent from the first candidate trajectory.

21. The method of claim 15, wherein the first candidate trajectory for the vehicle is determined by a first component, and wherein the second candidate trajectory for the vehicle is determined by a second component different from the first component.

22. The method of claim 15, wherein the first candidate trajectory is associated with a first threshold, and wherein the second candidate trajectory is associated with a second threshold different from the first threshold.

23. The method of claim 15, wherein the first candidate trajectory and the second candidate trajectory are generated simultaneously.

24. The method of claim 15, wherein at least one of the first candidate trajectory or the second candidate trajectory is based on a maximum acceleration or a maximum turning ability associated with the object type.

* * * * *